United States Patent
Altenhofen et al.

(10) Patent No.: US 7,153,137 B2
(45) Date of Patent: Dec. 26, 2006

(54) OFFLINE E-COURSES

(75) Inventors: Michael Altenhofen, Karlsruhe (DE);
Wolfgang Theilmann, Karlsruhe (DE);
Andreas S. Krebs, Karlsruhe (DE)

(73) Assignee: SAP AG, Walldorf (DE)

( * ) Notice: Subject to any disclaimer, the term of this patent is extended or adjusted under 35 U.S.C. 154(b) by 51 days.

(21) Appl. No.: 10/208,190

(22) Filed: Jul. 31, 2002

(65) Prior Publication Data
US 2003/0152901 A1 Aug. 14, 2003

Related U.S. Application Data

(63) Continuation-in-part of application No. 10/134,676, filed on Apr. 30, 2002.

(60) Provisional application No. 60/396,108, filed on Jul. 17, 2002, provisional application No. 60/354,945, filed on Feb. 11, 2002.

(51) Int. Cl.
*G09B 19/00* (2006.01)
(52) U.S. Cl. .................. 434/118; 434/350; 434/434; 434/362
(58) Field of Classification Search ............. 434/362, 434/350, 118
See application file for complete search history.

(56) References Cited

U.S. PATENT DOCUMENTS

| | | | |
|---|---|---|---|
| 5,008,853 A | 4/1991 | Bly et al. | |
| 5,310,349 A | 5/1994 | Daniels et al. | |
| 5,395,243 A | 3/1995 | Lubin et al. | |
| 5,584,699 A | 12/1996 | Silver | |
| 5,675,802 A | 10/1997 | Allen et al. | |
| 5,727,950 A | 3/1998 | Cook et al. | |
| 5,788,508 A | 8/1998 | Lee et al. | |
| 5,802,514 A | 9/1998 | Huber | |
| 5,881,315 A | 3/1999 | Cohen | |
| 6,011,949 A * | 1/2000 | Shimomukai | 434/358 X |
| 6,014,134 A | 1/2000 | Bell et al. | |
| 6,091,930 A | 7/2000 | Mortimer et al. | |
| 6,099,320 A | 8/2000 | Papadopoulos | |
| 6,112,049 A * | 8/2000 | Sonnenfeld | 434/350 X |
| 6,134,552 A | 10/2000 | Fritz et al. | |
| 6,148,338 A | 11/2000 | Lachelt et al. | |
| 6,149,438 A | 11/2000 | Richard et al. | |
| 6,149,441 A * | 11/2000 | Pellegrino et al. | 434/350 X |
| 6,162,060 A | 12/2000 | Richard et al. | |
| 6,164,974 A | 12/2000 | Carlile et al. | |
| 6,175,841 B1 | 1/2001 | Loiacono | |
| 6,212,358 B1 * | 4/2001 | Ho et al. | 434/362 |

(Continued)

FOREIGN PATENT DOCUMENTS

GB 2373625 A 9/2002

OTHER PUBLICATIONS

Jörg Siekmann et al., "Adaptive Course Generation and Presentation," ITS Workshop on Adaptive and Intelligent Web-Based Foundation System, Montreal, The Omega Group; pp. 1-10, 2000.

(Continued)

*Primary Examiner*—Chanda L. Harris
(74) *Attorney, Agent, or Firm*—Fish & Richardson P.C.

(57) ABSTRACT

A repository manager and copy editor may be used to create an offline course, which allow learners to process course material locally on their computer without the need to connect to the e-learning system. A generic packaging list is created when the course is offered offline. A specific packaging list customized for the learner is created when the offline course is downloaded. An offline manager tool provides an interface for taking the course offline.

34 Claims, 34 Drawing Sheets

U.S. PATENT DOCUMENTS

| | | | |
|---|---|---|---|
| 6,315,572 B1 | 11/2001 | Owens et al. | |
| 6,336,813 B1 | 1/2002 | Siefert | |
| 6,347,333 B1 | 2/2002 | Eisendrath et al. | |
| 6,347,943 B1 | 2/2002 | Fields et al. | |
| 6,368,110 B1 | 4/2002 | Koenecke et al. | |
| 6,370,355 B1 | 4/2002 | Ceretta et al. | |
| 6,381,444 B1 | 4/2002 | Aggarwal et al. | |
| 6,397,036 B1 | 5/2002 | Thean et al. | |
| 6,398,556 B1 | 6/2002 | Ho et al. | |
| 6,430,563 B1 | 8/2002 | Fritz et al. | |
| 6,470,171 B1 | 10/2002 | Helmick et al. | |
| 6,514,085 B1* | 2/2003 | Slattery et al. | 434/335 X |
| 6,527,556 B1 | 3/2003 | Koskinen | |
| 6,587,668 B1 | 7/2003 | Miller et al. | |
| 6,606,480 B1* | 8/2003 | L'Allier et al. | 434/362 X |
| 6,622,003 B1 | 9/2003 | Denious et al. | |
| 6,633,742 B1* | 10/2003 | Turner et al. | 434/350 X |
| 6,643,493 B1 | 11/2003 | Kilgore | |
| RE38,432 E | 2/2004 | Fai et al. | |
| 6,709,330 B1 | 3/2004 | Klein et al. | |
| 6,729,885 B1 | 5/2004 | Stuppy et al. | |
| 6,801,751 B1* | 10/2004 | Wood et al. | 434/362 |
| 2001/0044728 A1* | 11/2001 | Freeman et al. | 705/1 X |
| 2001/0047310 A1 | 11/2001 | Russell | |
| 2002/0006603 A1 | 1/2002 | Peterson et al. | |
| 2002/0042041 A1 | 4/2002 | Owens et al. | |
| 2002/0061506 A1 | 5/2002 | Catten et al. | |
| 2002/0073063 A1 | 6/2002 | Faraj | |
| 2002/0138841 A1 | 9/2002 | Ward | |
| 2002/0142278 A1 | 10/2002 | Whitehurst et al. | |
| 2002/0188583 A1 | 12/2002 | Rukavina et al. | |
| 2003/0013073 A1* | 1/2003 | Duncan et al. | 434/317 |
| 2003/0049593 A1 | 3/2003 | Parner et al. | |
| 2003/0073063 A1* | 4/2003 | Dattaray et al. | 434/350 |
| 2003/0073065 A1 | 4/2003 | Riggs | |
| 2003/0082508 A1 | 5/2003 | Barney | |
| 2003/0113700 A1* | 6/2003 | Simon | 434/350 |
| 2003/0129576 A1 | 7/2003 | Wood et al. | |
| 2003/0151629 A1* | 8/2003 | Krebs et al. | 345/810 |
| 2003/0152899 A1* | 8/2003 | Krebs et al. | 434/350 X |
| 2003/0152900 A1* | 8/2003 | Krebs et al. | 434/350 X |
| 2003/0152902 A1 | 8/2003 | Altenhofen et al. | |
| 2003/0152903 A1 | 8/2003 | Theilmann | |
| 2003/0152904 A1* | 8/2003 | Doty, Jr. | 434/350 |
| 2003/0152905 A1* | 8/2003 | Altenhofen et al. | 434/362 |
| 2003/0152906 A1* | 8/2003 | Krebs et al. | 434/362 |
| 2003/0157470 A1* | 8/2003 | Altenhofen et al. | 434/350 X |
| 2003/0163784 A1 | 8/2003 | Daniel et al. | |
| 2003/0175664 A1* | 9/2003 | Frangenheim et al. | 434/118 |
| 2003/0175676 A1* | 9/2003 | Theilmann et al. | 434/350 X |
| 2003/0211447 A1 | 11/2003 | Diesel et al. | |
| 2003/0224339 A1 | 12/2003 | Jain et al. | |
| 2004/0081951 A1 | 4/2004 | Vigue et al. | |

OTHER PUBLICATIONS

Lai Jin et al., "An Ontology-Aware Authoring Tool—Functional structure and guidance generation," Proceedings of AIED '99, pp. 85-92, LeManns France, 1999.

Dietrich Albert et al., "Adaptive and Dynamic Hypertext Tutoring Systems Based on Knowledge Space Theory," AIED '97 Artificial Intelligence in Education, Amsterdam vol. 39 of Froulier in Artificial Intelligence and Application, 1997.

Sylvie Ranwez et al., "Description and Construction of Pedagogical Material using an Ontology based DTD," AIED '99 Workshop 2 proceedings "Ontologies for Intelligent Educational Systems", pp. 1-4, 1999.

Michael Jungmann et al., "Adaptive Hypertext in Complex Information Spaces," Daimler-Benz Research & Technology, Technical University of Ilmenau, pp. 1-5, Mar. 8, 1997.

Nicola Henze et al., "Modeling Constructivist Teaching Functionality and Structure in the KBS Hyperbook Systems," University of Hannover, pp. 1-12, Jun. 4, 1999.

Max Mühlhäuser, "Cooperative Computer-Aided Authoring and Learning," University of Karlsruhe, pp. 107-130, 145-161, 165-192, 273-291, 293-318, 1995.

Professor Jouko Paaso, "A New Environment for Courseware Development, Course Delivery and Training," Proceedings of the ED-Media 97, Toronto, 1997.

U.S. Appl. No. 60/201,500, filed May 3, 2000, Adams.
U.S. Appl. No. 60/272,251, filed Feb. 28, 2001, Ward.
U.S. Appl. No. 60/329,088, filed Oct. 12, 2001, Riggs.
U.S. Appl. No. 60/334,714, filed Nov. 1, 2001, Diesel.
U.S. Appl. No. 60/400,606, filed Aug. 1, 2002, Diesel.

Hewlett Packard, "HP Open View Integration Guide for Developers," Jul. 2002, [online], [retrieved from the Internet on Mar. 24, 2004: http://h21007.www2.hp.com/dspp/files/unprotected/OpenView w/IntegrationGuide/OV_Integration_Guide_7_30.pdf], pp. 67-92, XP002274908.

Hewlett Packard, "hp OpenView Service Navigator for hp OpenView Operations 7.x for UNIX Product Brief," May 2002, [online], [retrieved from the Internet on Mar. 24, 2004: http://www.pervigil.com/PDF/HP/sernav_pb_jun02.pdf], 2 pgs., XP002274906.

Lipkin, Daniel, "Universal Learning Format Technical Specification," Jan. 13, 2001, [retrieved from the Internet on Jul. 29, 2004: http://xml.coverpages.org/ulf.html], pp. 1-3, XP002290517.

Sun Microsystems, "Developing Web Services with SUN™ Open Network Environment," Mar. 2002, [online], [retrieved from the Internet Mar. 24, 2004: http://wwws.sun.com/software/sunone/wp-spine/spine.pdf], pp. 1-32, XP002274909.

Trythall, Steve, "JMS and COBRA Notification Interworking," Dec. 12, 2001, [online], [retrieved from the Internet Mar. 24, 2004: http://www.onjava.com/pub/a/onjava/2001/12/12/jms_not.html], 8 pgs., XP002274907.

* cited by examiner

```xml
<?xml version="1.0" encoding="UTF-8"?>

<METADATA version="">
<LABEL>Using the Content Player</LABEL>
<GUID>3822</GUID>
<CMSPATH>/testnetze/Einstieg/v1/main.crs</CMSPATH>
<MACROSTRATEGY>mac_topdown</MACROSTRATEGY>
<MICROSTRATEGY>mic_orient_orient</MICROSTRATEGY>
<TPARTID>5000000013</TPARTID>
<RESOURCEREF>http://cms.acme.org:50090/lms/media/testnetze/Einstieg/offlinePackets/offlinePacket_Einstiegv1.xml</RESOURCEREF>
<RESOURCES base="http://cms.acme.org:50090/lms/media">
  <RESOURCE size="" mimetype="">/testnetze/Einstieg/v1/main.crs</RESOURCE>
  <RESOURCE size="" mimetype="">/testnetze/Einstieg/v1/einstieg.ie</RESOURCE>
  <RESOURCE size="" mimetype="">/testnetze/Einstieg/v1/einstieg/E00.html</RESOURCE>
  <RESOURCE size="" mimetype="">/testnetze/Einstieg/v1/einstieg/einstieg.html</RESOURCE>
  <RESOURCE size="" mimetype="">/testnetze/Einstieg/v1/einstieg/E01.html</RESOURCE>
  <RESOURCE size="" mimetype="">/testnetze/Teil1/v1/main.scs</RESOURCE>
  <RESOURCE size="" mimetype="">/testnetze/Teil1/v1/teilnetz1.ie</RESOURCE>
  <RESOURCE size="" mimetype="">/testnetze/Teil1/v1/teilnetz1/E01.html</RESOURCE>
  <RESOURCE size="" mimetype="">/testnetze/Teil1/v1/teilnetz1/teilnetz1.html</RESOURCE>
  <RESOURCE size="" mimetype="">/testnetze/LO4/v1/main.ide</RESOURCE>
  <RESOURCE size="" mimetype="">/testnetze/LO4/v1/orientierung.html</RESOURCE>
  <RESOURCE size="" mimetype="">/testnetze/LO4/v1/handlung.html</RESOURCE>
  <RESOURCE size="" mimetype="">/testnetze/LO4/v1/quelle.html</RESOURCE>
  <RESOURCE size="" mimetype="">/testnetze/LO4/v1/erklaerung.html</RESOURCE>
  <RESOURCE size="" mimetype="">/testnetze/sharedcontent/APIWrapper.js/v1.js</RESOURCE>
  <RESOURCE size="" mimetype="">/testnetze/sharedcontent/SCOFunctions_new.js/v1.js</RESOURCE>
  <RESOURCE size="" mimetype="">/testnetze/LO5/v1/quelle.html</RESOURCE>
  <RESOURCE size="" mimetype="">/testnetze/LO5/v1/erklaerung.html</RESOURCE>
  <RESOURCE size="" mimetype="">/testnetze/LO5/v1/orientierung.html</RESOURCE>
  <RESOURCE size="" mimetype="">/testnetze/LO5/v1/handlung.html</RESOURCE>
  <RESOURCE size="" mimetype="">/testnetze/LO5/v1/main.ide</RESOURCE>
  <RESOURCE size="" mimetype="">/testnetze/LO6/v1/erklaerung.html</RESOURCE>
  <RESOURCE size="" mimetype="">/testnetze/LO6/v1/quelle.html</RESOURCE>
  <RESOURCE size="" mimetype="">/testnetze/LO6/v1/main.ide</RESOURCE>
  <RESOURCE size="" mimetype="">/testnetze/LO6/v1/handlung.html</RESOURCE>
  <RESOURCE size="" mimetype="">/testnetze/LO6/v1/orientierung.html</RESOURCE>
  <RESOURCE size="" mimetype="">/testnetze/Teil2/v1/teilnetz2.ie</RESOURCE>
  <RESOURCE size="" mimetype="">/testnetze/Teil2/v1/main.scs</RESOURCE>
  <RESOURCE size="" mimetype="">/testnetze/Teil2/v1/teilnetz2/E01.html</RESOURCE>
  <RESOURCE size="" mimetype="">/testnetze/Teil2/v1/teilnetz2/teilnetz2.html</RESOURCE>
  <RESOURCE size="" mimetype="">/testnetze/LO8/v1/handlung.html</RESOURCE>
  <RESOURCE size="" mimetype="">/testnetze/LO8/v1/quelle.html</RESOURCE>
  <RESOURCE size="" mimetype="">/testnetze/LO8/v1/orientierung.html</RESOURCE>
  <RESOURCE size="" mimetype="">/testnetze/LO8/v1/erklaerung.html</RESOURCE>
  <RESOURCE size="" mimetype="">/testnetze/LO8/v1/main.ide</RESOURCE>
  <RESOURCE size="" mimetype="">/testnetze/LO7/v1/orientierung.html</RESOURCE>
  <RESOURCE size="" mimetype="">/testnetze/LO7/v1/main.ide</RESOURCE>
  <RESOURCE size="" mimetype="">/testnetze/LO7/v1/quelle.html</RESOURCE>
  <RESOURCE size="" mimetype="">/testnetze/LO7/v1/erklaerung.html</RESOURCE>
  <RESOURCE size="" mimetype="">/testnetze/LO7/v1/handlung.html</RESOURCE>
  <RESOURCE size="" mimetype="">/testnetze/Teil3/v1/main.scs</RESOURCE>
  <RESOURCE size="" mimetype="">/testnetze/Teil3/v1/teilnetz3.ie</RESOURCE>
  <RESOURCE size="" mimetype="">/testnetze/Teil3/v1/teilnetz3/teilnetz3.html</RESOURCE>
  <RESOURCE size="" mimetype="">/testnetze/Teil3/v1/teilnetz3/E01.html</RESOURCE>
  <RESOURCE size="" mimetype="">/testnetze/LO9/v1/handlung.html</RESOURCE>
  <RESOURCE size="" mimetype="">/testnetze/LO9/v1/main.ide</RESOURCE>
  <RESOURCE size="" mimetype="">/testnetze/LO9/v1/orientierung.html</RESOURCE>
  <RESOURCE size="" mimetype="">/testnetze/LO9/v1/erklaerung.html</RESOURCE>
  <RESOURCE size="" mimetype="">/testnetze/LO9/v1/quelle.html</RESOURCE>
  <RESOURCE size="" mimetype="">/testnetze/sharedcontent/test-2-pre-.html/v1.html</RESOURCE>
  <RESOURCE size="" mimetype="">/testnetze/LO1/v1/quelle.html</RESOURCE>
  <RESOURCE size="" mimetype="">/testnetze/LO1/v1/erklaerung.html</RESOURCE>
  <RESOURCE size="" mimetype="">/testnetze/LO1/v1/handlung.html</RESOURCE>
  <RESOURCE size="" mimetype="">/testnetze/LO3/v1/erklaerung.html</RESOURCE>
  <RESOURCE size="" mimetype="">/testnetze/LO3/v1/handlung.html</RESOURCE>
  <RESOURCE size="" mimetype="">/testnetze/LO3/v1/main.ide</RESOURCE>
  <RESOURCE size="" mimetype="">/testnetze/LO3/v1/quelle.html</RESOURCE>
<RESOURCES>
</METADATA>
```

FIG. 35

OFFLINE E-COURSES

CROSS-REFERENCE TO RELATED APPLICATIONS

This application is a continuation-in-part of U.S. application Ser. No. 10/134,676, filed Apr. 30, 2002, and titled E-LEARNING SYSTEM, which claims the benefit of U.S. Provisional Application No. 60/354,945, filed Feb. 11, 2002, and titled FLEXIBLE INSTRUCTIONAL ARCHITECTURE FOR E-LEARNING, and this application claims the benefit of U.S. Provisional Application No. 60/396,108, filed Jul. 17, 2002, and titled OFFLINE LEARNING, all of which are hereby incorporated by reference in their entirety for all purposes.

TECHNICAL FIELD

The following description relates generally to e-learning and in particular to offline e-courses.

BACKGROUND

Systems and applications for delivering computer-based training (CBT) have existed for many years. However, CBT systems historically have not gained wide acceptance. A problem hindering the reception of CBTs as a means of training workers and learners is the compatibility between systems. A CBT system works as a stand-alone system that is unable to use content designed for use with other CBT systems.

Early CBTs also were based on hypermedia systems that statically linked content. User guidance was given by annotating the hyperlinks with descriptive information. The trainee could proceed through learning material by traversing the links embedded in the material. The structure associated with the material was very rigid, and the material could not be easily written, edited, or reused to create additional or new learning material.

Newer methods for intelligent tutoring and CBT systems are based on special domain models that must be defined prior to creation of the course or content. Once a course is created, the material may not be easily adapted or changed for different learners' specific training needs or learning styles. As a result, the courses often fail to meet the needs of the trainee and/or trainer.

The special domain models also have many complex rules that must be understood prior to designing a course. As a result, a course is too difficult for most authors to create who have not undergone extensive training in the use of the system. Even authors who receive sufficient training may find the system difficult and frustrating to use. In addition, the resulting courses may be incomprehensible due to incorrect use of the domain model by the authors creating the course.

Furthermore, although online training provides a robust environment for learning, it is not always convenient for a learner to take courses online. In addition, there are also times when an online connections is not available. Therefore, for the above and other reasons, new methods and technology are needed to supplement traditional computer based training and instruction and provide offline training.

SUMMARY

In one general aspect, creating an offline course includes determining content associated with an online course; and determining a packaging list for an offline course including an access path and metadata, wherein the metadata is associated with the online course and the content. The packaging list may be a generic packaging list. The generic packaging list may include metadata including one or more of a title, a GUID, a content management system path, and resources. The generic packaging list may be stored in a content repository.

The content of an online course may be tested to determine whether all structural elements of the course are accessible from the content management system. The packaging list may be stored in the content repository if it is determined that all structural elements are accessible.

The offline course associated with the stored generic packaging list may be published. Publishing the offline course may include storing an indication in a course catalog for access by a learning interface that an online course is available offline. The indication may include an access path for the generic packaging list.

Creating the course also may include determining a learner specific packaging list that includes learner dependent metadata. Determining the learner specific packaging list may includes merging a generic packaging list with the learner specific metadata. The learner specific packaging list may include determining one or more of a microstrategy, a macrostrategy, a TPARTDOC, and a resourceref.

In another general aspect, a learning system may be used to create and offline course. The learning management system may include a content management system to store online courses including structure and content; and a repository manager to query the content management system to determine content associated with an online course and to determine a packaging list including an access path and metadata associated with all files that are part of the online course. The packaging list may be a generic packaging list. The generic packaging list may include learner independent metadata including one or more of a title, a GUID, a content management system path, and resources. The content repository may be configured to write the generic packaging list in the content repository.

The repository manager may be configured to test the content to determine whether all structural elements of the course are accessible from the content management system. The repository manager also may be configured to write the packaging list in the content repository if it is determined that all structural elements of the online course are accessible. The repository manager may publish the offline course associated with the stored generic packaging list and store an indication in a course catalog that an online course is available offline. The indication may include an access path for the generic packaging list.

The learning system also may a learning management system to determine a learner specific packaging list that includes learner dependent metadata. The learner specific packaging list may include merging a generic packaging list with the learner specific metadata. The learner specific packaging list may include one or more of a microstrategy, a macrostrategy, a TPARTDOC, and a resourceref.

Other features and advantages will be apparent from the description, the drawings, and the claims.

DESCRIPTION OF DRAWINGS

FIG. 35 is an example of a user specific packaging list.

Like reference symbols in the various drawings indicate like elements.

DETAILED DESCRIPTION

E-learning Content Structure

The e-learning system and methodology structures content so that the content is reusable and flexible. For example, the content structure allows the creator of a course to reuse existing content to create new or additional courses. In addition, the content structure provides flexible content delivery that may be adapted to the learning styles of different learners.

Figure 1:
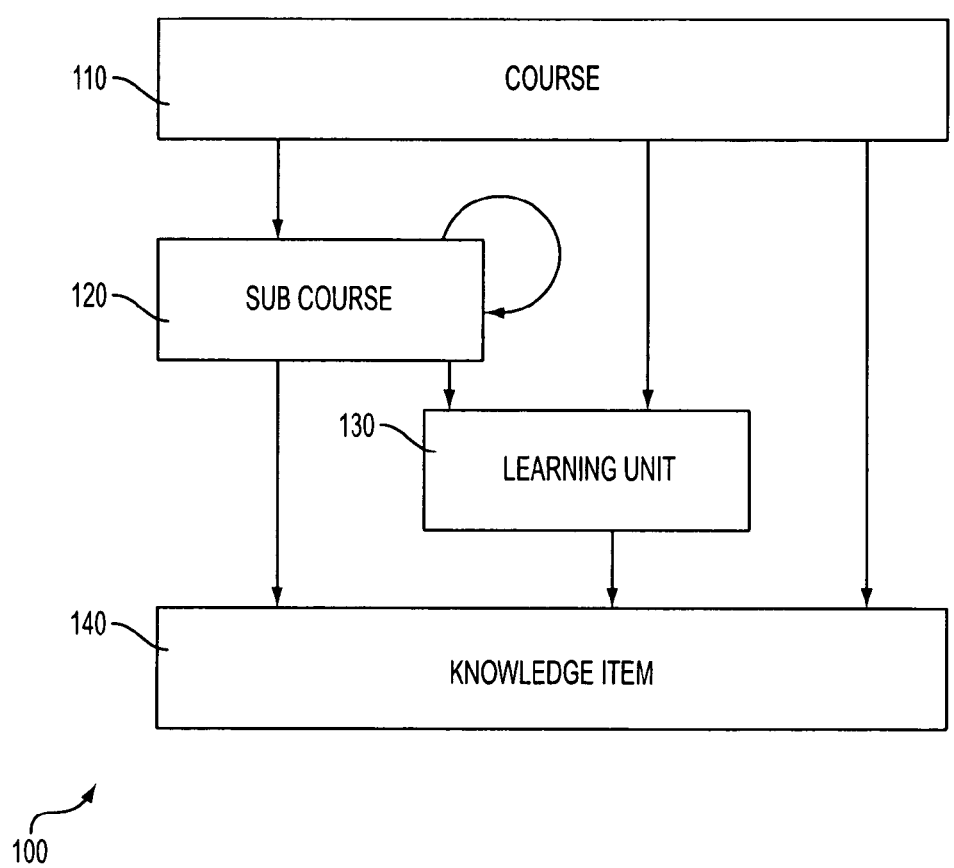
FIG. 1 is an exemplary content aggregation model.

E-learning content may be aggregated using a number of structural elements arranged at different aggregation levels. Each higher level structural element may refer to any instances of all structural elements of a lower level. At its lowest level, a structural element refers to content and may not be further divided. According to one implementation shown in FIG. 1, course material 100 may be divided into four structural elements: a course 110, a sub-course 120, a learning unit 130, and a knowledge item 140.

Starting from the lowest level, knowledge items 140 are the basis for the other structural elements and are the building blocks of the course content structure. Each knowledge item 140 may include content that illustrates, explains, practices, or tests an aspect of a thematic area or topic. Knowledge items 140 typically are small in size (i.e., of short duration, e.g., approximately five minutes or less).

A number of attributes may be used to describe a knowledge item 140, such as, for example, a name, a type of media, and a type of knowledge. The name may be used by a learning system to identify and locate the content associated with a knowledge item 140. The type of media describes the form of the content that is associated with the knowledge item 140. For example, media types include a presentation type, a communication type, and an interactive type. A presentation media type may include a text, a table, an illustration, a graphic, an image, an animation, an audio clip, and a video clip. A communication media type may include a chat session, a group (e.g., a newsgroup, a team, a class, and a group of peers), an email, a short message service (SMS), and an instant message. An interactive media type may include a computer based training, a simulation, and a test.

A knowledge item 140 also may be described by the attribute of knowledge type. For example, knowledge types include knowledge of orientation, knowledge of action, knowledge of explanation, and knowledge of source/reference. Knowledge types may differ in learning goal and content. For example, knowledge of orientation offers a point of reference to the learner, and, therefore, provides general information for a better understanding of the structure of interrelated structural elements. Each of the knowledge types is described in further detail below.

Knowledge items 140 may be generated using a wide range of technologies, however, a browser (including plug-in applications) should be able to interpret and display the appropriate file formats associated with each knowledge item. For example, markup languages (such as a Hypertext Markup language (HTML), a standard generalized markup language (SGML), a dynamic HTML (DHTML®), or an extensible markup language (XML)), JAVASCRIPT® (a client-side scripting language), and/or FLASH® may be used to create knowledge items 140.

HTML may be used to describe the logical elements and presentation of a document, such as, for example, text, headings, paragraphs, lists, tables, or image references.

FLASH® may be used as a file format for FLASH® movies and as a plug-in for playing FLASH® files in a browser. For example, FLASH® movies using vector and bitmap graphics, animations, transparencies, transitions, MP3 audio files, input forms, and interactions may be used. In addition, FLASH® allows a pixel-precise positioning of graphical elements to generate impressive and interactive applications for presentation of course material to a learner.

Learning units 130 may be assembled using one or more knowledge items 140 to represent, for example, a distinct, thematically-coherent unit. Consequently, learning units 130 may be considered containers for knowledge items 140 of the same topic. Learning units 130 also may be considered relatively small in size (i.e., duration) though larger than a knowledge item 140.

Sub-courses 120 may be assembled using other sub-courses 120, learning units 130, and/or knowledge items 140. The sub-course 120 may be used to split up an extensive course into several smaller subordinate courses. Sub-courses 120 may be used to build an arbitrarily deep nested structure by referring to other sub-courses 120.

Courses may be assembled from all of the subordinate structural elements including sub-courses 120, learning units 130, and knowledge items 140. To foster maximum reuse, all structural elements should be self-contained and context free.

Structural elements also may be tagged with metadata that is used to support adaptive delivery, reusability, and search/retrieval of content associated with the structural elements. For example, learning object metadata (LOM) defined by the IEEE "Learning Object Metadata Working Group" may be attached to individual course structure elements. The metadata may be used to indicate learner competencies associated with the structural elements. Other metadata may include a number of knowledge types (e.g., orientation, action, explanation, and resources) that may be used to categorize structural elements.

Figure 2:
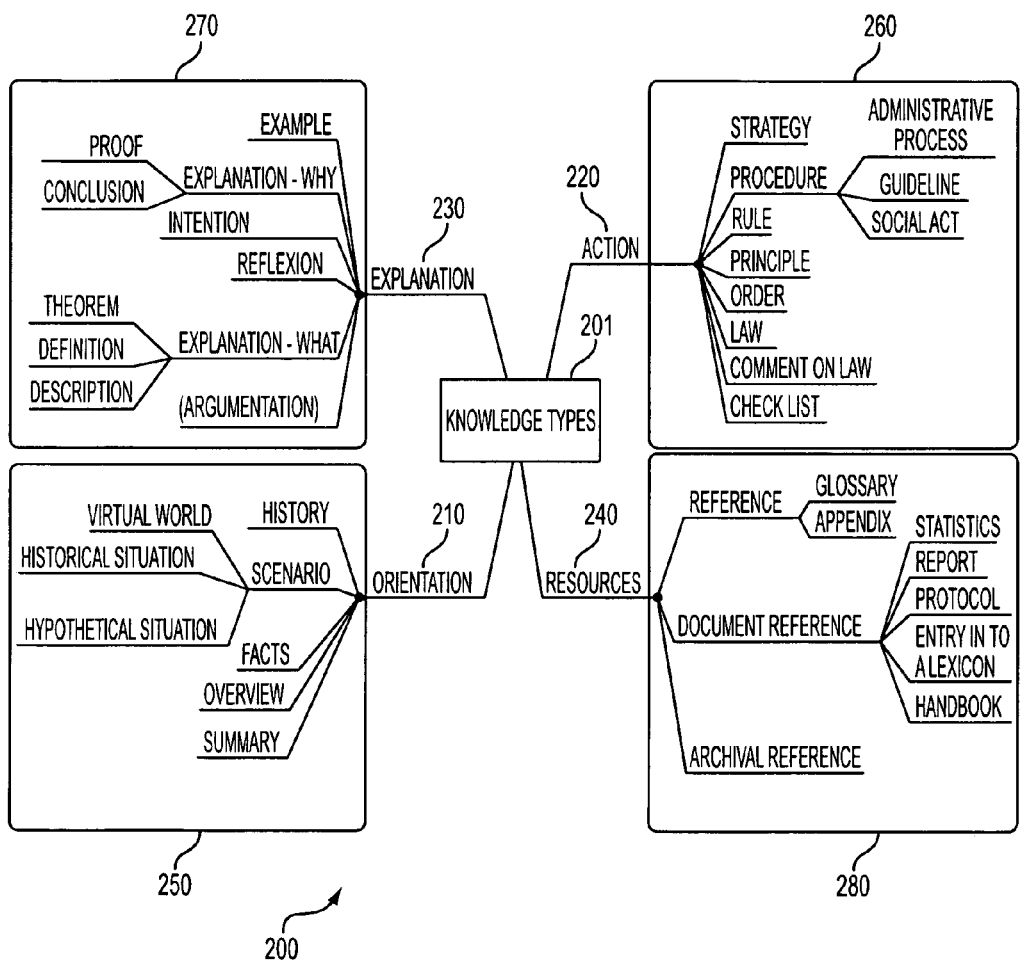
FIG. 2 is an example of an ontology of knowledge types.

As shown in FIG. 2, structural elements may be categorized using a didactical ontology 200 of knowledge types 201 that includes orientation knowledge 210, action knowledge 220, explanation knowledge 230, and reference knowledge 240. Orientation knowledge 210 helps a learner to find their way through a topic without being able to act in a topic-specific manner and may be referred to as "know what." Action knowledge 220 helps a learner to acquire topic related skills and may be referred to as "know how." Explanation knowledge 230 provides a learner with an explanation of why something is the way it is and may be referred to as "know why." Reference knowledge 240 teaches a learner where to find additional information on a specific topic and may be referred to as "know where."

The four knowledge types (orientation, action, explanation, and reference) may be further divided into a fine grained ontology as shown in FIG. 2. For example, orientation knowledge 210 may refer to sub-types 250 that include a history, a scenario, a fact, an overview, and a summary. Action knowledge 220 may refer to sub-types 260 that include a strategy, a procedure, a rule, a principle, an order, a law, a comment on law, and a checklist. Explanation knowledge 230 may refer to sub-types 270 that include an example, a intention, a reflection, an explanation of why or what, and an argumentation. Resource knowledge 240 may refer to sub-types 280 that include a reference, a document reference, and an archival reference.

Dependencies between structural elements may be described by relations when assembling the structural elements at one aggregation level. A relation may be used to describe the natural, subject-taxonomic relation between the structural elements. A relation may be directional or non-directional. A directional relation may be used to indicate that the relation between structural elements is true only in one direction. Directional relations should be followed. Relations may be divided into two categories: subject-taxonomic and non-subject taxonomic.

Subject-taxonomic relations may be further divided into hierarchical relations and associative relations. Hierarchical relations may be used to express a relation between structural elements that have a relation of subordination or superordination. For example, a hierarchical relation between the knowledge items A and B exists if B is part of A. Hierarchical relations may be divided into two categories: the part/whole relation (i.e., "has part") and the abstraction relation (i.e., "generalizes"). For example, the part/whole relation "A has part B," describes that B is part of A. The abstraction relation "A generalizes B" implies that B is a specific type of A (e.g., an aircraft generalizes a jet or a jet is a specific type of aircraft).

Associative relations may be used refer to a kind of relation of relevancy between two structural elements. Associative relations may help a learner obtain a better understanding of facts associated with the structural elements. Associative relations describe a manifold relation between two structural elements and are mainly directional (i.e., the relation between structural elements is true only in one direction). Examples of associative relations include "determines," "side-by-side," "alternative to," "opposite to," "precedes," "context of," "process of," "values," "means of," and "affinity."

The "determines" relation describes a deterministic correlation between A and B (e.g., B causally depends on A). The "side-by-side" relation may be viewed from a spatial, conceptual, theoretical, or ontological perspective (e.g., A side-by-side with B is valid if both knowledge objects are part of a superordinate whole). The side-by-side relation may be subdivided into relations, such as "similar to," "alternative to," and "analogous to." The "opposite to" relation implies that two structural elements are opposite in reference to at least one quality. The "precedes" relation describes a temporal relationship of succession (e.g., A occurs in time before B (and not that A is a prerequisite of B)). The "context of" relation describes the factual and situational relationship on a basis of which one of the related structural elements may be derived. An "affinity" between structural elements suggests that there is a close functional correlation between the structural elements (e.g., there is an affinity between books and the act of reading because reading is the main function of books).

Non Subject-Taxonomic relations may include the relations "prerequisite of" and "belongs to." The "prerequisite of" and the "belongs to" relations do not refer to the subject-taxonomic interrelations of the knowledge to be imparted. Instead, these relations refer to the progression of the course in the learning environment (e.g., as the learner traverses the course). The "prerequisite of" relation is directional whereas the "belongs to" relation is non-directional. Both relations may be used for knowledge items 140 that cannot be further subdivided. For example, if the size of the screen is too small to display the entire content on one page, the page displaying the content may be split into two pages that are connected by the relation "prerequisite of."

Another type of metadata is competencies. Competencies may be assigned to structural elements, such as, for example, a sub-course 120 or a learning unit 130. The competencies may be used to indicate and evaluate the performance of a learner as the learner traverse the course material. A competency may be classified as a cognitive skill, an emotional skill, an senso-motorical skill, or a social skill.

Figure 3:
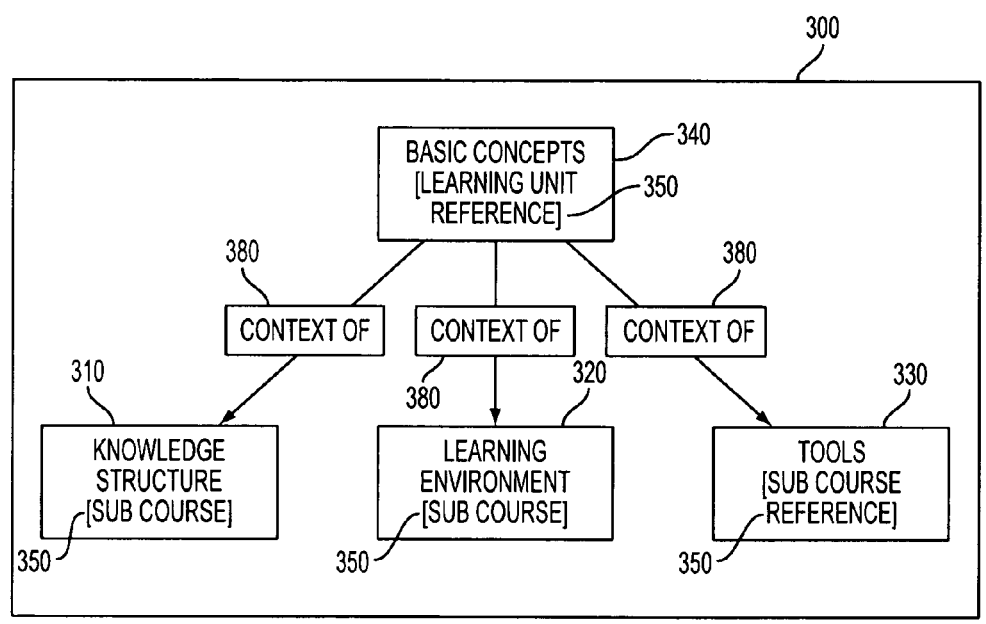
FIG. 3 is an example of a course graph for e-learning.

The content structure associated with a course may be represented as a set of graphs. A structural element may be represented as a node in a graph. Node attributes are used to convey the metadata attached to the corresponding structural element (e.g., a name, a knowledge type, a competency, and/or a media type). A relation between two structural elements may be represented as an edge. For example, FIG. 3 shows a graph 300 for a course. The course is divided into four structural elements or nodes (310, 320, 330, and 340): three sub-courses (e.g., knowledge structure, learning environment, and tools) and one learning unit (e.g., basic concepts). A node attribute 350 of each node is shown in brackets (e.g., the node labeled "Basic concepts" has an attribute that identifies it as a reference to a learning unit). In addition, an edge 380 expressing the relation "context of" has been specified for the learning unit with respect to each of the sub-courses. As a result, the basic concepts explained in the learning unit provide the context for the concepts covered in the three sub-courses.

Figure 4:
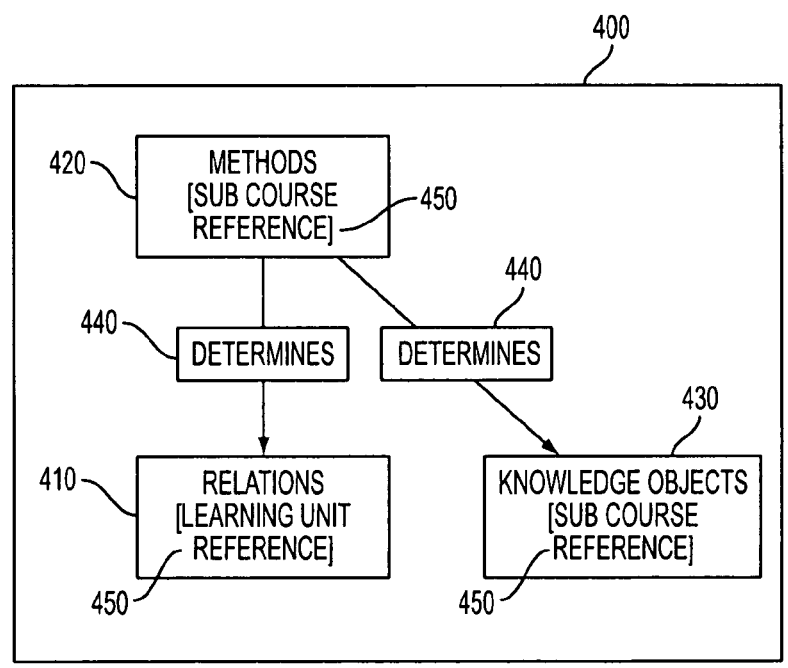
FIG. 4 is an example of a sub-course graph for e-learning.

FIG. 4 shows a graph 400 of the sub-course "Knowledge structure" 350 of FIG. 3. In this example, the sub-course "Knowledge structure" is further divided into three nodes (410, 420, and 430): a learning unit (e.g., on relations) and two sub-courses (e.g., covering the topics of methods and knowledge objects). The edge 440 expressing the relation "determines" has been provided between the structural elements (e.g., the sub-course "Methods" determines the sub-course "Knowledge objects" and the learning unit "Relations".) In addition, the attribute 450 of each node is shown in brackets (e.g., nodes "Methods" and "Knowledge objects" have the attribute identifying them as references to other sub-courses; node "Relations" has the attribute of being a reference to a learning unit).

Figure 5:
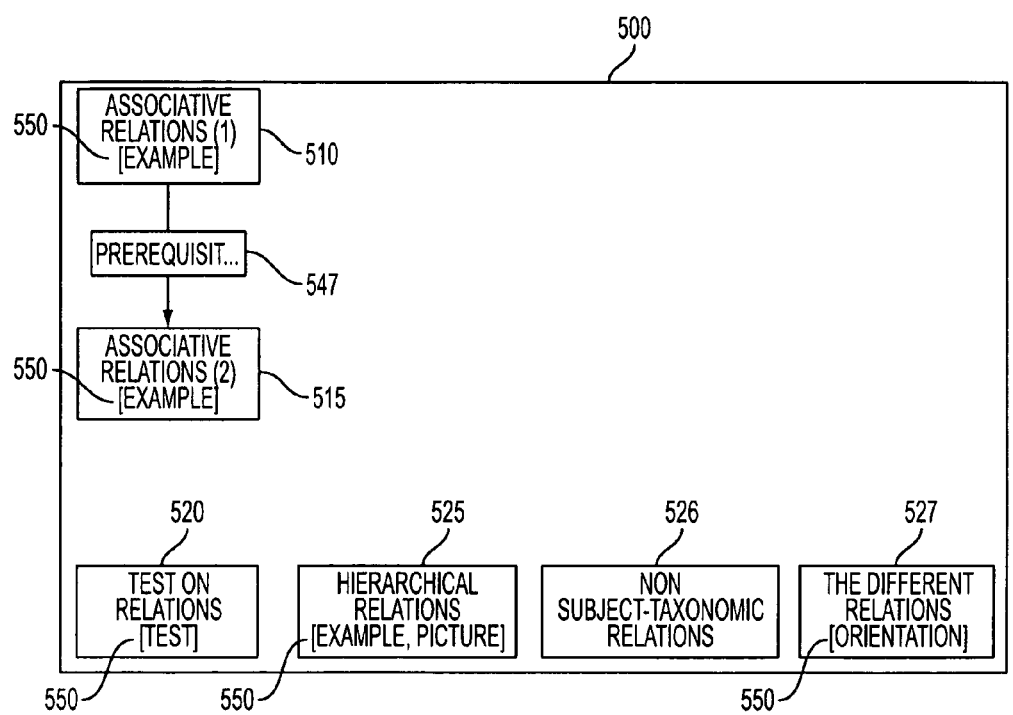
FIG. 5 is an example of a learning unit graph for e-learning.

FIG. 5 shows a graph 500 for the learning unit "Relations" 450 shown in FIG. 4. The learning unit includes six nodes (510, 515, 520, 525, 530, 535, 540, and 545): six knowledge items (i.e., "Associative relations (1)", "Associative relations (2)", "Test on relations", "Hierarchical relations", "Non subject-taxonomic relations", and "The different relations"). An edge 547 expressing the relation "prerequisite" has been provided between the knowledge items "Associative relations (1)" and "Associative relations (2)." In addition, attributes 550 of each node are specified in brackets (e.g., the node "Hierarchical relations" includes the attributes "Example" and "Picture").

E-learning Strategies

The above-described content aggregation and structure associated with a course does not automatically enforce any sequence that a learner may use to traverse the content associated with the course. As a result, different sequencing rules may be applied to the same course structure to provide different paths through the course. The sequencing rules applied to the knowledge structure of a course are learning strategies. The learning strategies may be used to pick specific structural elements to be suggested to the learner as the learner progresses through the course. The learner or supervisor (e.g., a tutor) may select from a number of different learning strategies while taking a course. In turn, the selected learning strategy considers both the requirements of the course structure and the preferences of the learner.

In the classical classroom, a teacher determines the learning strategy that is used to learn course material. For example, in this context the learning progression may start with a course orientation, followed by an explanation (with examples), an action, and practice. Using the e-learning system and methods, a learner may choose between one or more learning strategies to determine which path to take through the course. As a result, the progression of learners through the course may differ.

Learning strategies may be created using macro-strategies and micro-strategies. A learner may select from a number of different learning strategies when taking a course. The learning strategies are selected at run time of the presentation of course content to the learner (and not during the design of the knowledge structure of the course). As result, course authors are relieved from the burden of determining a sequence or an order of presentation of the course material. Instead, course authors may focus on structuring and annotating the course material. In addition, authors are not required to apply complex rules or Boolean expressions to domain models thus minimizing the training necessary to use the system. Furthermore, the course material may be easily adapted and reused to edit and create new courses.

Macro-strategies are used in learning strategies to refer to the coarse-grained structure of a course (i.e., the organization of sub-courses 120 and learning units 130). The macro-strategy determines the sequence that sub-courses 120 and learning units 130 of a course are presented to the learner. Basic macro-strategies include "inductive" and "deductive," which allow the learner to work through the course from the general to the specific or the specific to the general, respectively. Other examples of macro-strategies include "goal-based, top-down," "goal-based, bottom-up," and "table of contents."

Goal-based, top-down follows a deductive approach. The structural hierarchies are traversed from top to bottom. Relations within one structural element are ignored if the relation does not specify a hierarchical dependency. Goal-based bottom-up follows an inductive approach by doing a depth first traversal of the course material. The table of contents simply ignores all relations.

Micro-strategies, implemented by the learning strategies, target the learning progression within a learning unit. The micro-strategies determine the order that knowledge items of a learning unit are presented. Micro-strategies refer to the attributes describing the knowledge items. Examples of micro-strategies include "orientation only", "action oriented", "explanation-oriented", and "table of contents").

The micro-strategy "orientation only" ignores all knowledge items that are not classified as orientation knowledge. The "orientation only" strategy may be best suited to implement an overview of the course. The micro-strategy "action oriented" first picks knowledge items that are classified as action knowledge. All other knowledge items are sorted in their natural order (i.e., as they appear in the knowledge structure of the learning unit). The micro-strategy "explanation oriented" is similar to action oriented and focuses on explanation knowledge. Orientation oriented is similar to action oriented and focuses on orientation knowledge. The micro-strategy "table of contents" operates like the macro-strategy table of contents (but on a learning unit level).

In one implementation, no dependencies between macro-strategies and micro-strategies exist. Therefore, any combination of macro and micro-strategies may be used when taking a course. Application of learning strategies to the knowledge structure of a course is described in further detail below.

E-Learning System

Figure 6:
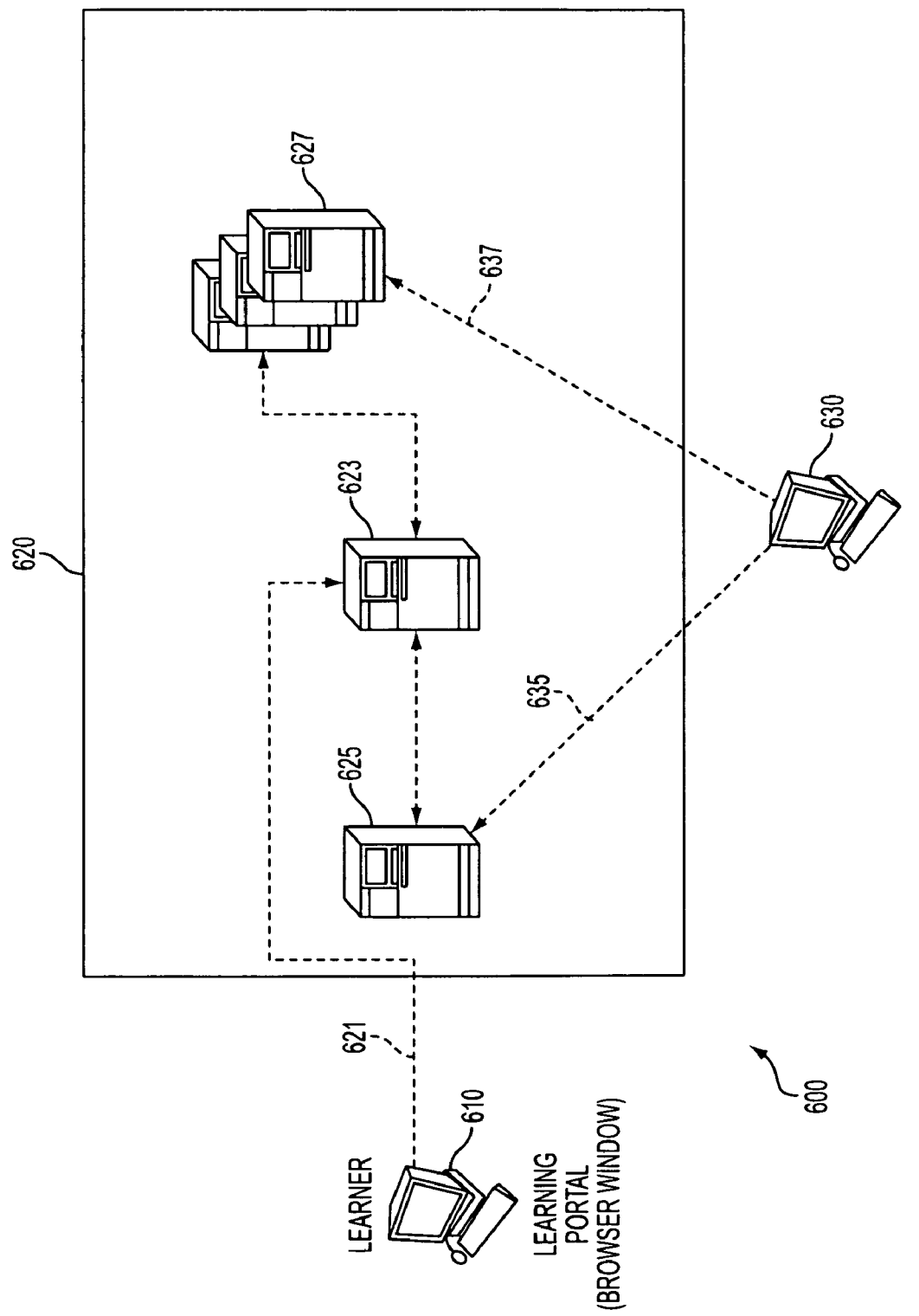
FIGS. 6 and 7 are exemplary block diagrams of e-learning systems.

As shown in FIG. 6 an e-learning architecture 600 may include a learning station 610 and a learning system 620. The learner may access course material using a learning station 610 (e.g., using a learning portal). The learning station 610 may be implemented using a work station, a computer, a portable computing device, or any intelligent device capable of executing instructions and connecting to a network. The learning station 610 may include any number of devices and/or peripherals (e.g., displays, memory/storage devices, input devices, interfaces, printers, communication cards, and speakers) that facilitate access to and use of course material.

The learning station 610 may execute any number of software applications, including an application that is configured to access, interpret, and present courses and related information to a learner. The software may be implemented using a browser, such as, for example, NETSCAPE COMMUNICATOR®,MICROSOFT INTERNET EXPLORER®, or any other software application that may be used to interpret and process a markup language, such as HTML, SGML, DHTML®, or XML.

The browser also may include software plug-in applications that allow the browser to interpret, process, and present different types of information. The browser may include any number of application tools, such as, for example, JAVA®, ACTIVE®, JAVASCRIPT®, AND FLASH®.

The browser may be used to implement a learning portal that allows a learner to access the learning system 620. A link 621 between the learning portal and the learning system 620 may be configured to send and receive signals (e.g., electrical, electromagnetic, or optical). In addition, the link may be a wireless link that uses electromagnetic signals (e.g., radio, infrared, to microwave) to convey information between the learning station and the learning system.

The learning system may include one or more servers. As shown in FIG. 6, the learning system 620 includes a learning management system 623, a content management system 625, and an administration management system 627. Each of these systems may be implemented using one or more servers, processors, or intelligent network devices.

Figure 7:
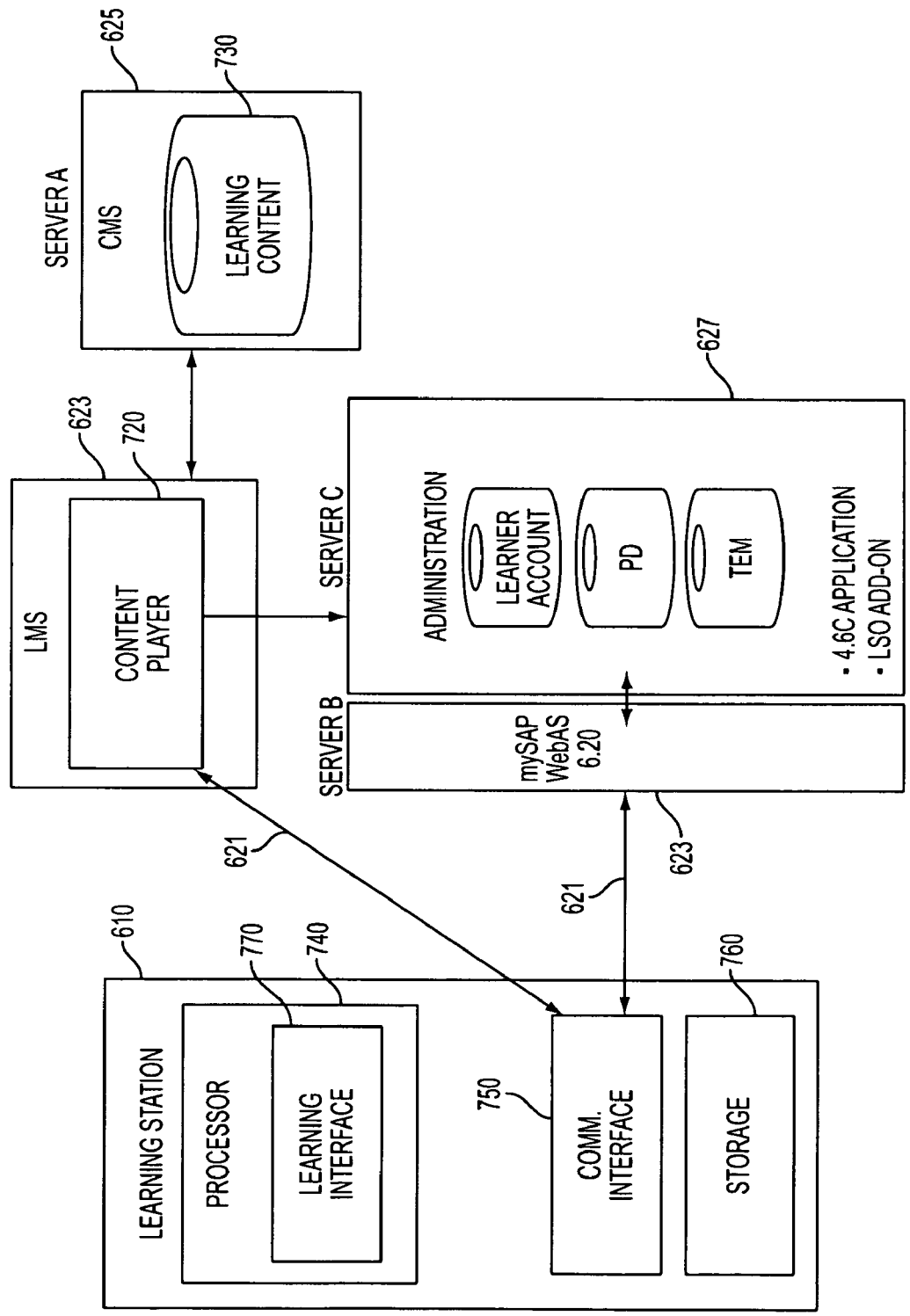

As shown in FIGS. 6 and 7, the administration management system 627 may be implemented using a server, such as, for example, the SAP R/3 4.6C+LSO Add-On. The administration management system 627 may include a database of learner accounts and course information. For example, the learner account may include demographic data about the learner (e.g., a name, an age, a sex, an address, a company, a school, an account number, and a bill) and his/her progress through the course material (e.g., places visited, tests completed, skills gained, knowledge acquired, and competency using the material). The administration management system 627 also may provide additional information about courses, such as course title, description, courses offered, the author/instructor of a course, and the most popular courses.

The content management system 625 may include a learning content server 730. The learning content server 730 may be implemented using a WebDAV server. The learning content server may include a content repository. The content repository may store course files and media files that are used to present a course to a learner at the learning station 610. The course files may include the structural elements that make up a course and may be stored as XML files. The media files may be used to store the content that is included in the course and assembled for presentation to the learner at the learning station 610.

The learning management system 623 may include a content player 720. The content player 720 may be implemented using a server, such as an SAP J2EE Engine. The content player 720 is used to obtain course material from the content repository. The content player 720 also applies the learning strategies to the obtained course material to generate a navigation tree or path for the learner. The navigation tree or path is used to suggest a route through the course material for the learner and to generate a presentation of course material to the learner based on the learning strategy selected by the learner. Course navigation is described in further detail below.

The learning management system 623 also may include an interface for exchanging information with the administration management system 627. For example, the content player 720 may update the learner account information as the learner progresses through the course material to indicate, for example, competencies gained, tests passed, courses completed.

Learning Station

The learner may access information about a course, content associated with a course, information about the learning system 620, and information about the learner (e.g., the learner account) using the learning station 610. As shown in FIG. 7, the learning station 610 may include a processor 740, a storage device 750, and a communications interface 760. The learning station also may include any number of peripherals or integrated devices (not shown) (e.g., displays, memory/storage devices, input devices, ports/interfaces, printers, communication cards, and speakers) that facilitate access to, presentation of, and interaction with the course, its content, and associated course information.

The processor may be used to implement a learning interface 770. For example, the processor may execute any number of software applications including a learning interface that is configured to access, interpret, and present a course and associated information to a learner, and to allow a learner to interact with the content and the learning system. The learning station also may provide access to learner account information.

The software may include a browser, such as, for example, NETSCAPE COMMUNICATOR®, MICROSOFT INTERNET EXPLORER®, or any other software application that may be used to interpret and process a markup language, such as HTML, SGML, DHTML®,XML, or XHTML.

The browser also may include software plug-in applications that allow the browser to interpret, process, and present different types of information. The browser may include any number of application tools, such as, for example, Java, Active X, JavaScript, and Flash.

The communications interface may facilitate the exchange of data and information between the learning station and the learning system. For example, the communications interface may be a communications card, a modem, a port, a transceiver or a device that provides a connection to the communications link 621. Data may be received from the learning system and processed by the processor and/or stored in the storage. Similarly, data processed by the processor and/or stored in the storage may be transmitted to the learning system.

As described above, the learner may contact the learning system using the learning station to access a course. The learning interface and associated browser may be used to implement a graphical user interface that accepts information input from the learner and presents information received from the learning system. FIGS. 8–21 illustrate various functions and display windows that may be used to implement the graphical user interface. Each of the figures is discussed in detail below.

Learning Interface

The learning interface may be used to search a course catalog, book and cancel course participation, and support individual course planning (e.g., by determining qualification deficits and displaying a learner's completed, started, and planned training activities). The learner also may access and work through web based courses using the learning interface. The learning interface may be used to start a course, reenter a course, exit a course, and take tests. The learning interface also provides messages, notes, and special course offerings to the learner.

A personalized learner account is stored by the learning administration system. The learning management system uses the account information to prepare displays for the learner and to facilitate the learner's interaction with the learning system. The learner account includes information about training activities (e.g., completed, in process, and planned course), course prebookings, a notebook, qualifications, qualification matchups, and a preferred learning strategy. The learning interface may be used to view and to interact with the learner account information.

Figure 8:
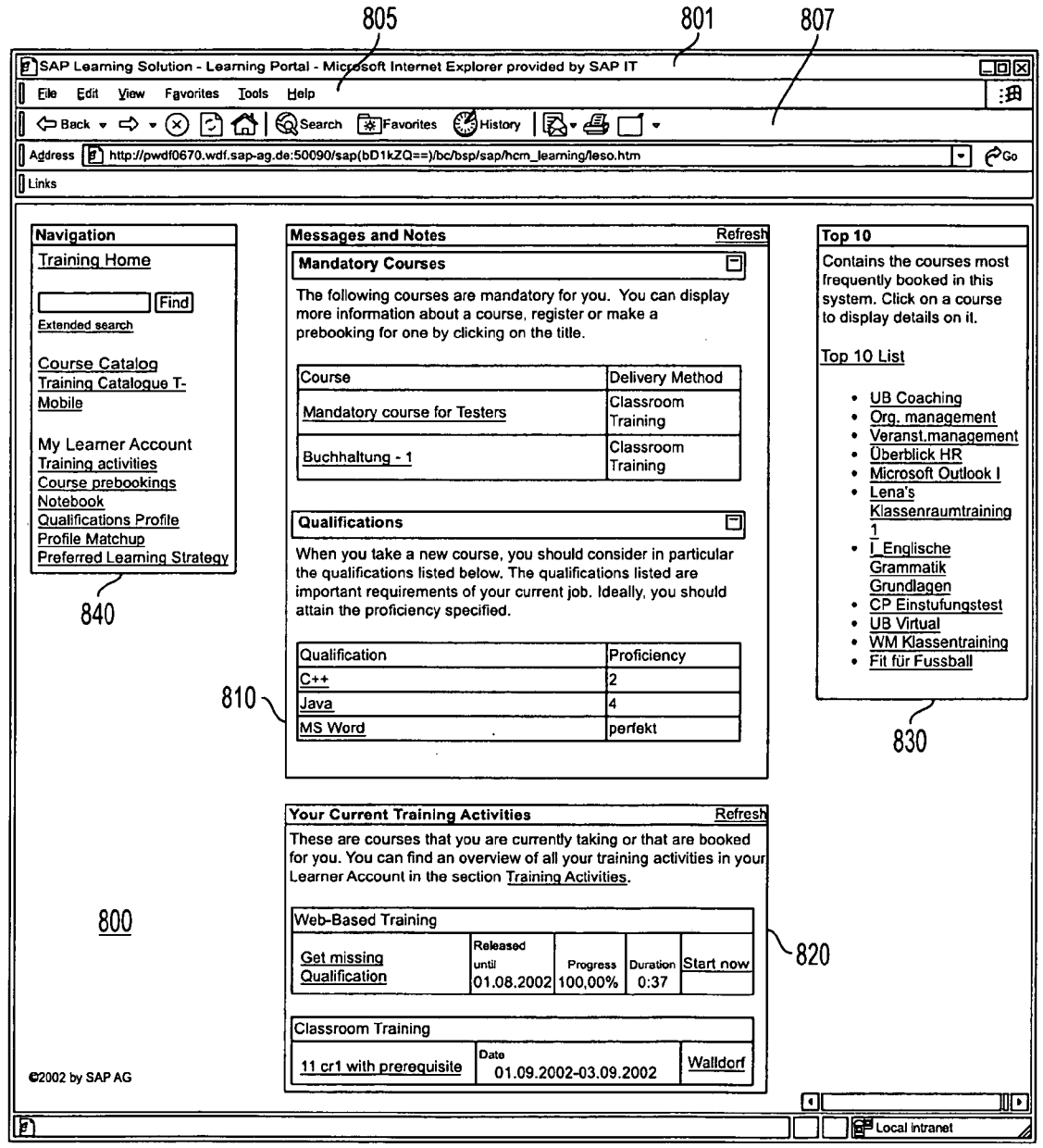
FIGS. 8–21 are exemplary screen shots of a learning interface.

FIG. 8 shows an initial learner interface screen 800 that is presented by the learner interface. The screen 800 may include a title bar 801, a menu bar 805, and a tool bar 807. In addition, the screen 800 may include a number of windows including a message and notes window 810, a current activities window 820, a top 10 window 830, and a navigation window 840.

The message and notes window may be used to provide access to information about courses. For example, an employer may use the messages and notes window to distribute company wide information about courses to all employees. The messages and notes window also may be used by the employer to determine whether an employee has received, read, and/or confirmed receipt of the information. For example, the learning administration system may determine when a message is delivered to an employee, when an employee accesses a note or message using the window, and/or when an employee confirms or acknowledges receipt of a message.

As shown in FIG. 8, the message and notes window may include a mandatory courses section containing courses that are prescribed for the learner, a qualifications section displaying essential requirements for a learner (e.g., related to a learner's job description), and an area displaying the scheduled dates of courses for which the employee is prebooked (not shown). The learning administration system may generate a list of courses that impart any necessary qualifications based on the learner's qualifications stored in the administration system. The learning management system may access this information when generating the messages and notes window.

A current training activities window may be used to provide the learner with detailed information on personal training activities that are planned and/or are currently in process. Current training activities may include courses that the learner has booked for a fixed date in the future (e.g., classroom training) and courses that the learner has booked that have no scheduled course date (e.g., web based courses). The learner also may start an active web based course by selecting a start now hyperlink. Depending on the type of course, the current training activities window may display course details (e.g., information from the course catalog), details about a scheduled course (e.g., participant list or course location).

The learning administration system may generate a top 10 list of the courses most frequently booked using the learning system. The top 10 list may be displayed in the top 10 window. The top 10 window also may be used to create a specialized course offering list (e.g., a course list specific to a particular company, university, or organization).

The navigation window may be used by the learner to navigate through the various information that is provided by the learning system. The navigation window may include a hyperlink to a home page (e.g., the initial screen 800), a find field, a course catalog hyperlink and various learner account hyperlinks.

The find field may be used to search for courses using a keyword contained in the title or course description. A learner may enter keyword information in the find field using an interface (e.g., a keyboard connected to the learning station). Selecting the find button creates a hit list (not shown) that displays a list of course information that corresponds to the keyword. The learner may display detailed information from the hit list by selecting a hyperlink directly from the hit list. The search function may be used to find a course without having to browse through the course catalog.

For example, if a learner wants to improve his or her knowledge of English, the learner may enter the keyword English and start a search. The resulting hit list displays all courses and delivery methods found that have the keyword English in the course title or description. The learner may select a course from the hit list and display further details about the course, such as course dates or prerequisite qualifications for the course.

The navigation window also provides an extended search hyperlink that may be used to restrict search criteria (e.g., if the hit list includes too many items). The extended search hyperlink also may be accessed from the hit list. The learning interface may be automatically configured to display the extended search hyperlink if a hit list resulting from a search contains more than a predetermined number of entries (e.g., 20 entries).

Figure 9:
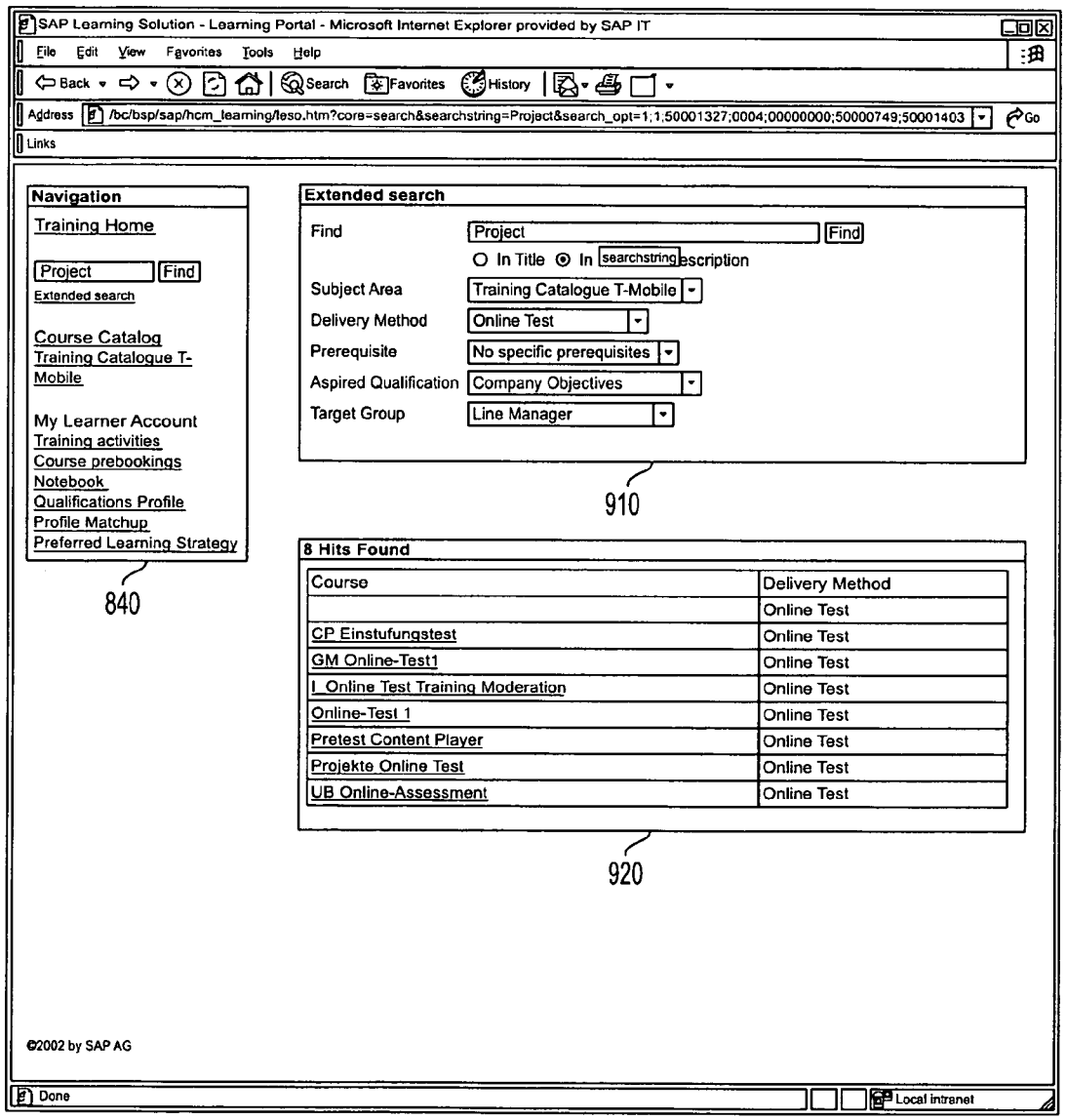

As shown in FIG. 9, an extended search window 910 may be used to restrict search criteria and specify, for example, whether the keyword search should be executed for the course title or the course description. The search also may be refined using a number of search entries that include a subject area, a delivery method, a course prerequisite, an aspired qualification, and a target group. A field may be provided for each of these entries including a drop-down menu (which may use to populate the fields). All of the extended search entries are optional allowing a learner to select one or more as desired.

For example, if the keyword search for English courses returns a large number of courses, the learner may use the extended search function to limit the search. For example, if the learner is only interested in in-house courses, the learner may select in-house training from the delivery method field (e.g., which lists of all of the delivery methods available in the system). Selecting find produces a hit list that displays all courses with English in their title or description that are classified as in-house courses. A hit list window 920 may be provided to show the results of the search (which may be further refined using the extended search window). A course may be directly selected from the hit list window.

The navigation window is provided with a number of hyperlinks to other windows. The hyperlinks may used to navigate through the information presented by the learning interface. For example, the navigation window may include a course catalog, a specific training catalog, and specific learner account information (e.g., including training activities, course prebookings, a notebook, a qualifications profile, a profile matchup, and a preferred learning strategy).

The course catalog (not shown) allows a learner to navigate through any courses offered by the learning system. Courses may be provided using several different delivery methods, such as online learning or classroom training. As described above, the learner may use the search features to find a specific course in the catalog.

Courses also may be accessed from the list of subject areas in the navigation window and from the overall view provided by the course catalog. Subject areas constitute a thematic structuring of the offered courses. The use of subject areas enables the courses to be structured thematically rather than hierarchically and thus present a picture of the overall structure of the courses. The learner may access a detailed screen of a subject area and course using the interface (both of which are described in detail below).

The courses may be displayed in the catalog overview according to their subject areas. The learner may access a subject area or a course by selecting a hyperlink from the course overview. Selecting a hyperlink accesses a corresponding detailed screen with all of the relevant information and descriptions. An example of a course catalog structure is shown below.

| Course Catalog | | | |
|---|---|---|---|
| Subject Areas (Course groups) | Languages | Computer Science | Personnel Management |
| Assigned Subject Areas | English French | Programming Languages | Recruitment Personnel |

-continued

| Course Catalog | | | | |
|---|---|---|---|---|
| Subject Areas (Course groups) | Languages | Computer Science | Personnel Management | |
| (Course groups) | | Databases Networks | Development Shift Planning | |
| Courses (Course types) | Business English I Technical English | Java Script C++ | Holding Employee Reviews | |

Figure 10:
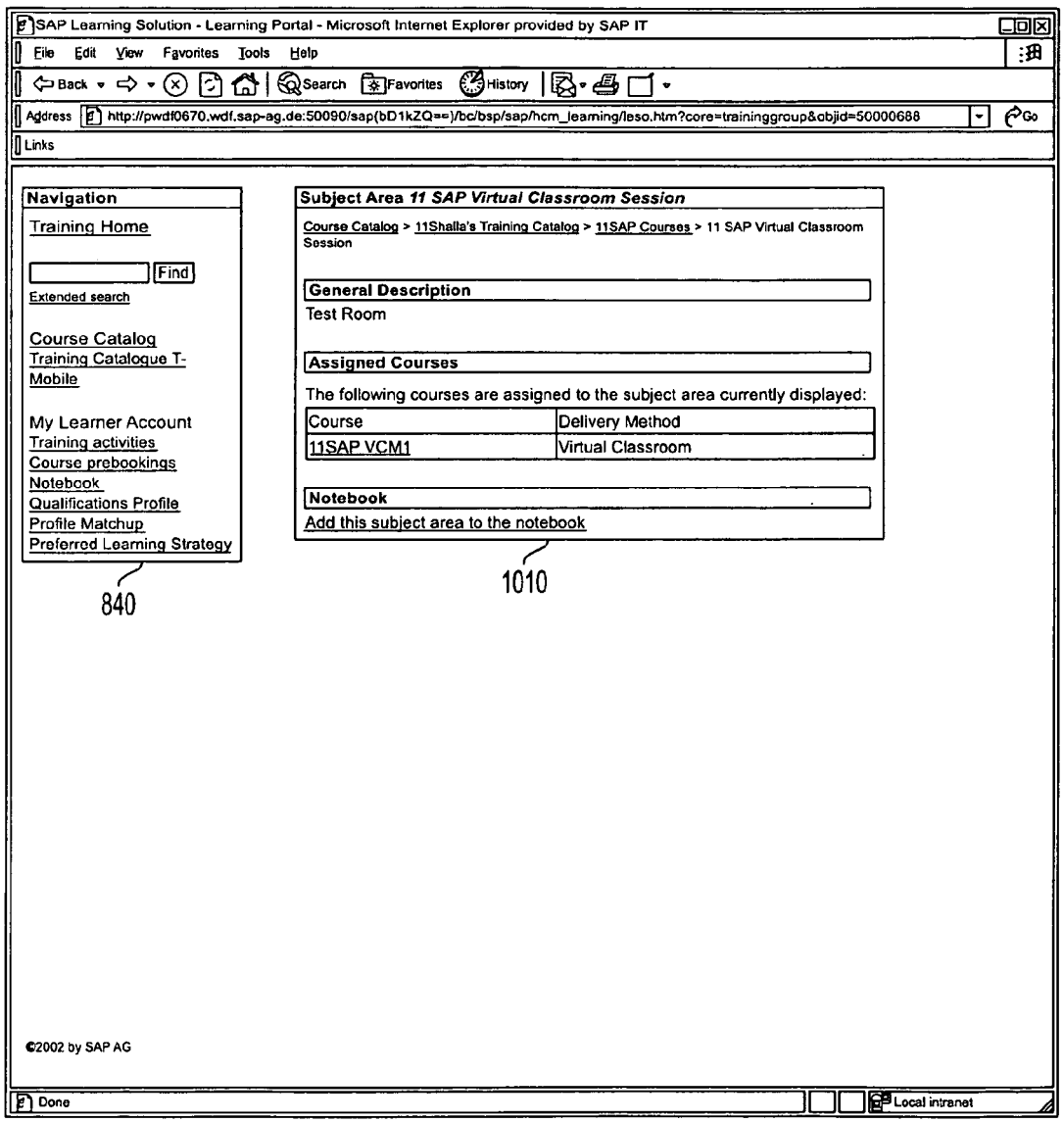

As shown in FIG. 10, the subject area window 1010 may be used to display all data relevant in a subject area. The subject area window may include the subject area, a general description of the subject area, courses assigned to the subject area, and a hyperlink to add the subject area to a learner's notebook. The subject area window also may include a navigation route from the course catalog to the current page.

Courses also may be offered as part of a curriculum. A curriculum is a collection of courses that may be booked in one step. Alternative courses may be offered for any course within the curriculum. If alternative courses are offered, the learner must decide which of the alternatives within the curriculum are desired before booking a curriculum. The curriculum course information displayed depends on the delivery method of the courses contained in the curriculum (e.g., whether the courses are time-dependent or time-independent). The learning system provides a display of the courses that make up the curriculum in a planned sequence; however, the actual sequence of the courses in the curriculum can deviate from the planned sequence.

The learner may book a curriculum directly from the course catalog or the find function in the navigation window. Once the curriculum is selected, the prerequisites or required knowledge (e.g., qualifications) for booking the curriculum are displayed. If the learner does not have the prerequisites, the system displays the course or courses that impart the required qualifications. The learner may select the curriculum and book it directly if the prerequisites for the curriculum are fulfilled, and there are not multiple alternative courses possible for any course of the curriculum.

If some elements of the curriculum specify alternative courses, the learner must select one of the alternatives in each case before booking the curriculum. For example, a curriculum for Java programming may include, a five-day introductory course, a three-day advanced course, and an online certification. The capacity of the introductory course may be 30 participants, but the capacity of the advanced course may be only 10 participants. In order to give all 30 participants the opportunity of attending the advanced course, the curriculum offers three alternative advanced courses. Before booking the curriculum, the learner must decide which of the three alternatives to take.

Detailed course information may be displayed based on the course delivery method (e.g., time-independent courses, such as Web-based courses, or time-dependent courses, such as classroom training).

Figure 11:
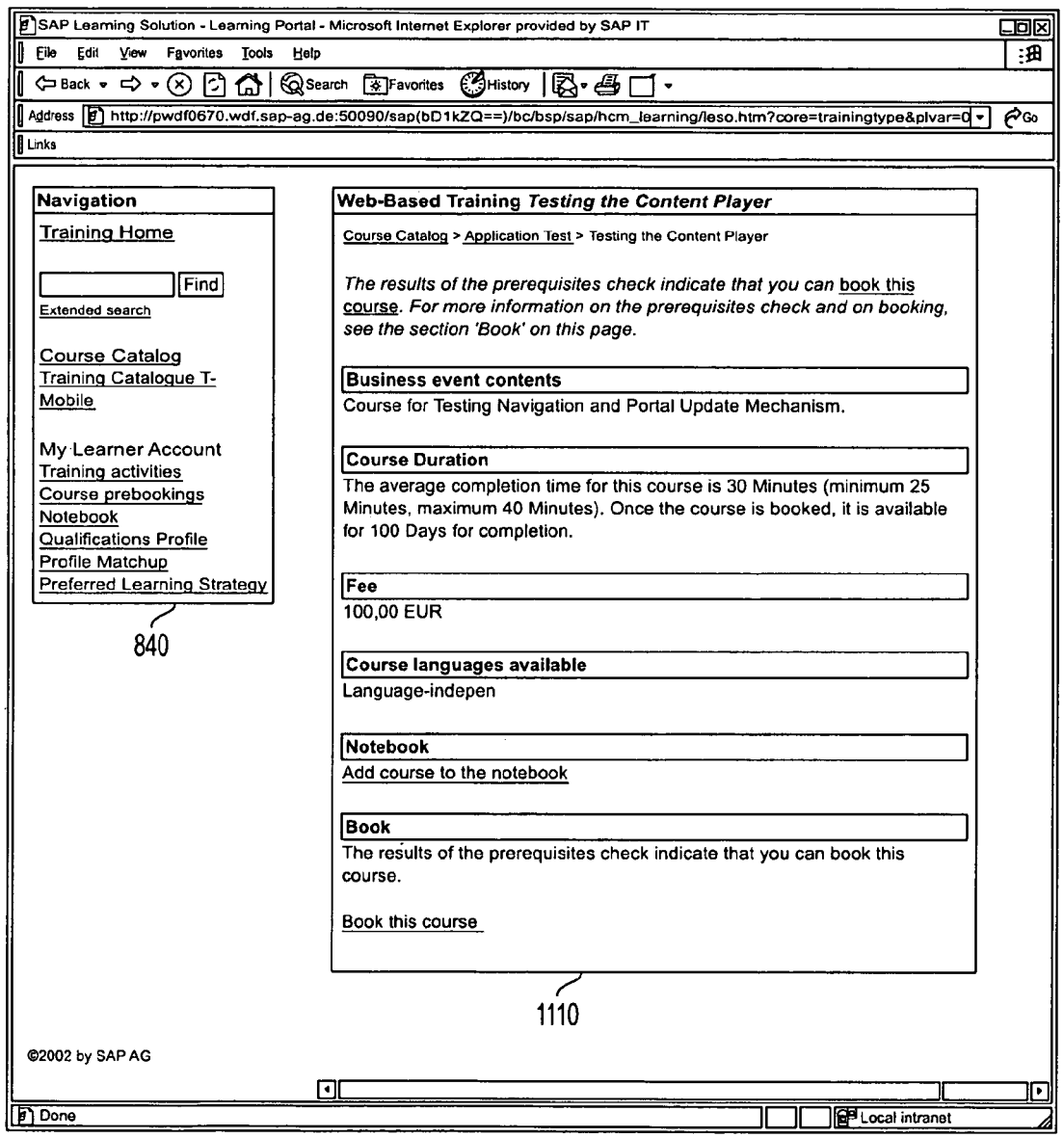

As shown in FIG. 11, the detailed display for a web based course window 1110 includes a navigation route from the current page to the course catalog. The navigation route provides the learner with an orientation and pinpoints where the learner is in the course catalog. Status messages about current operations (e.g., booking, prebooking, notebook) also may be displayed. For example, if the learner has made a booking, a prebooking, or added a course to the learner's personal notebook, an appropriate message may be displayed (e.g., "The results of the prerequisites check indicate that you can book this course"). The message may describe the status of the operation performed. For example, the message may include information about whether a booking or prebooking may be made, or for what reasons it cannot be made.

The web based course window may display course content including a title and a course description. Notes may provide additional information about the selected course. Time duration information may be included (e.g., a minimum, an optimum, and a maximum completion time). In addition, course availability information (e.g., a period of time from the date of the course booking during which the course is available to the learner) may be displayed.

The web based course window may include a target group that designates a group of learners for which a course is designed. A list of prerequisites also may be displayed that includes the required qualifications that a participant of the course should obtain before beginning the course. A hyperlink may be provided to display the courses providing the required qualification. The web based course window also may include a listing of attainable qualifications that may be attained through successful completion of a course. The system also may display the proficiency of the qualification imparted.

Follow-up courses and the corresponding course delivery methods may be suggested. Fees charged for course participation also may be displayed. If a course is offered in multiple languages, the various languages may be displayed and selected by the learner.

A course owner (e.g., the person responsible for authoring the course) also may be displayed in the web based course window. If the learner is given the required authorization, the course owner's e-mail address may be accessed by selecting the course owner name (e.g., causing an e-mail window may automatically appear populated with the address). The name of the training provider may be displayed, and, with the required authorization, the learner may access the training provider's home page by clicking the name. Hyperlinks may be provided to access further information on the Web.

The web based course window may display the progress of the learner including, for example, the dates of the first and last course access, the number of structural elements within the course completed, the percentage of the course completed, the number of learning objectives already achieved, and the completion time to date in minutes.

The course displayed in the web-based course window may be added to the learner's personal notebook. The learner may book the course directly using the hyperlink provided. In addition, the learner may start working on the course immediately by selecting a start hyperlink. The learner also may stop working on the course and resume working on a course where the course was interrupted using the web based course window. The learner may set the course as completed when the course has been finished. Any the learning objectives that have been achieved are entered as qualifications in the learner account.

Figure 12:
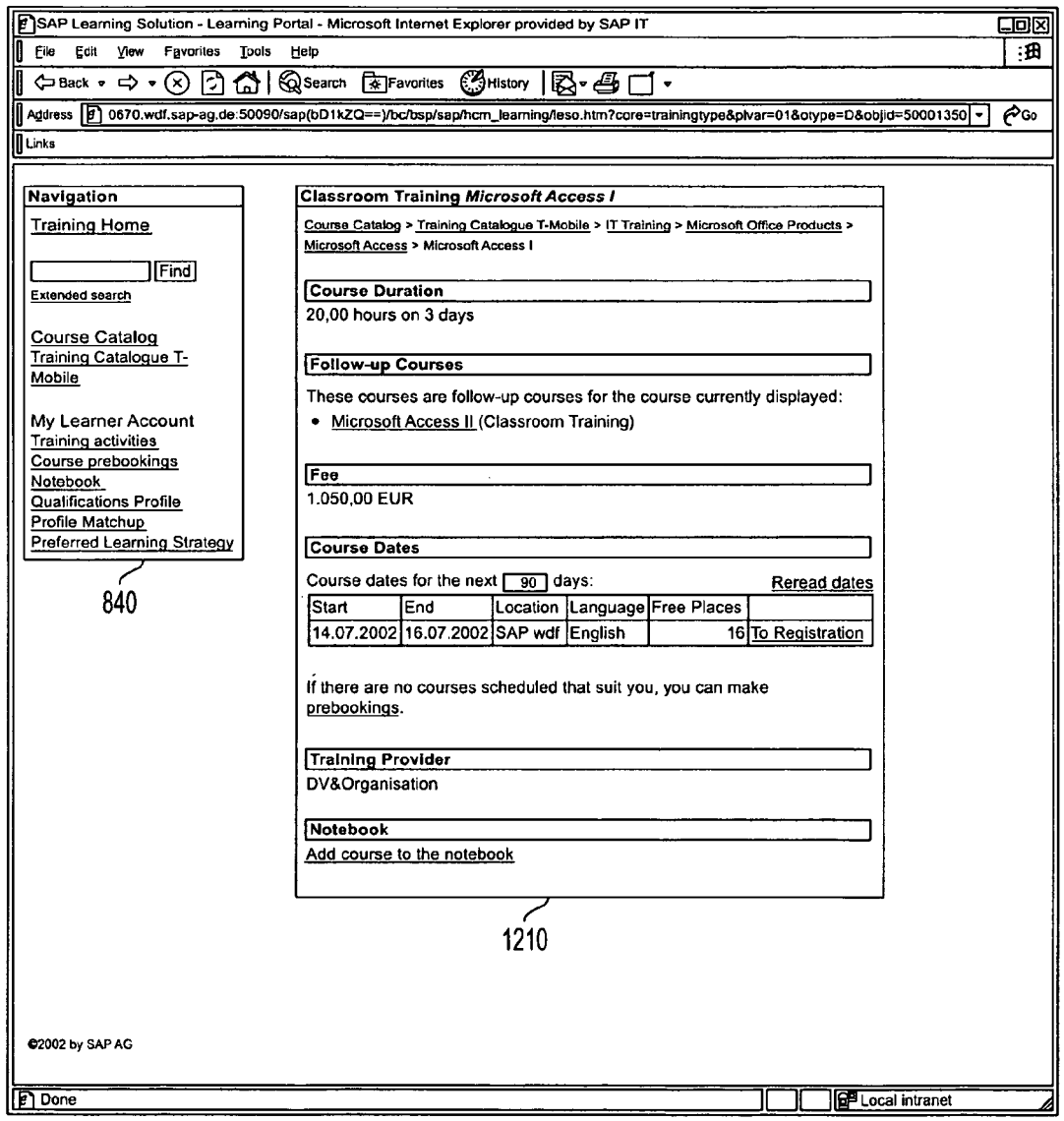

As shown in FIG. 12, the general course window 1210 for a time-dependent course may include a title and a navigation route to show the location of the window in the course catalog. The general course window may include a course duration and any related follow-up courses. A fee for booking the course may be included.

The course dates for a designated time period that the course is offered (e.g., the next 90 days) may be displayed. If none of the dates are suitable, the learner may enter alternate dates to check course availability. For each date that a course is offered the display may include the start date, the end date, the course location, the language in which the course will be held, and the number of free places left in the course. The learner may be offered the choice to book or prebook a course directly from the general course window using a registration hyperlink or a prebook hyperlink. A training provider of the course also may be displayed. A hyperlink to add the course to the learner's notebook also may be provided.

Figure 13:
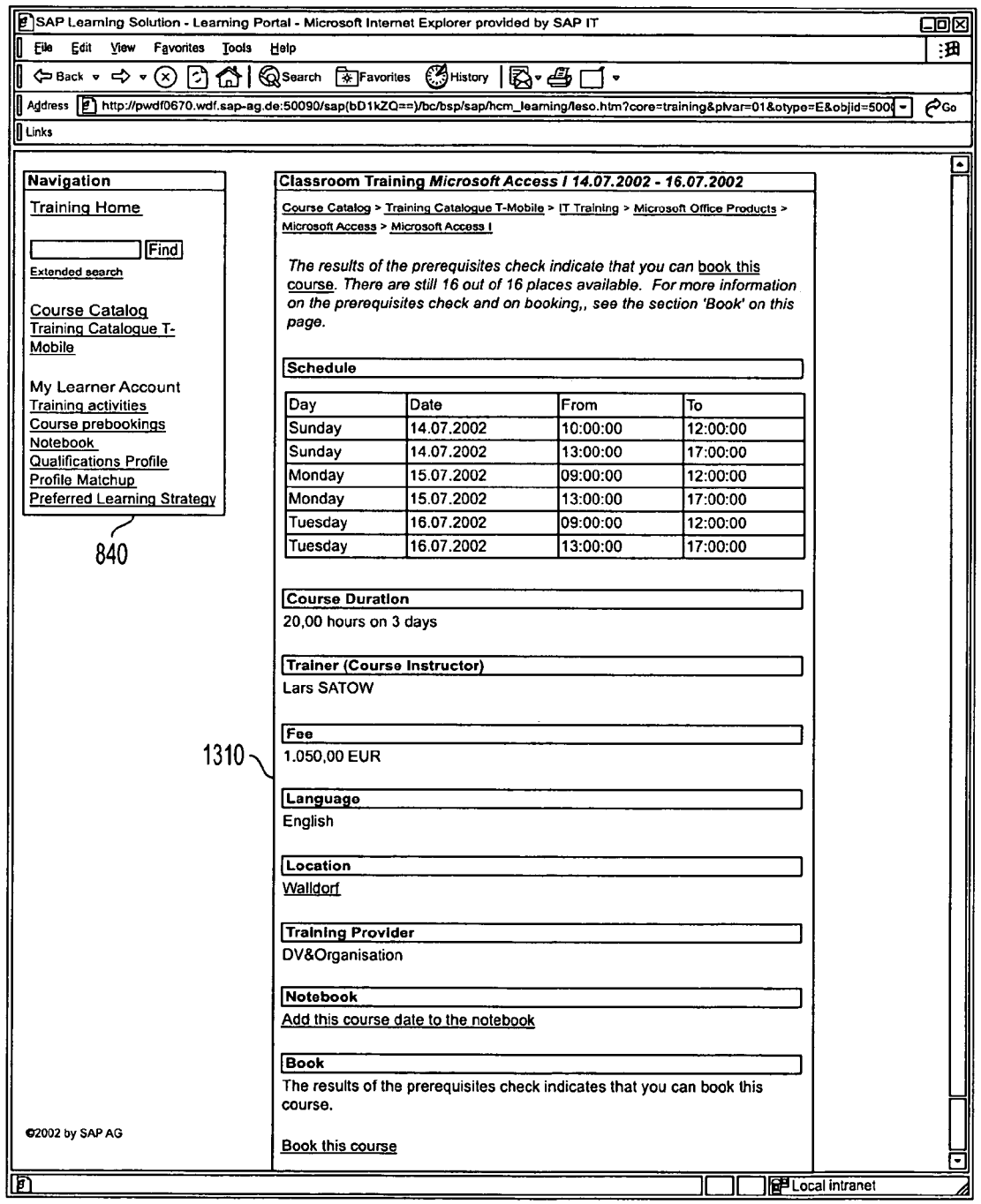

A detailed course window 1310 for a particular instance of a course is shown in FIG. 13. The detailed course window includes a title, a navigation route, and a message area. A schedule for the course may be provided. The course duration, trainer (e.g., instructor), fee, language, location, and training provider may be displayed. A hyperlink to add the course to the learner's notebook, and a hyperlink to book the course may be provided.

The description in the detailed course window for time-dependent courses includes a schedule of times the course is offered. The course duration also is displayed including, for example, the total number of course hours and days. A participant list may be displayed if the learner has the required authorization. In addition, e-mail addresses may be accessed from the participant list with the required authorization.

A waiting list may be provided if the course is full. The learner may make or cancel a waiting list booking directly from a hyperlink provided in the waiting list. The name of the training instructor may be displayed along with the location that the course is offered (e.g., the room number and directions).

The learner account provides the learner with a clear overview of learning activities and supports personal decision making processes of the learner. The learner account includes courses that are planned, in process, and completed by the learner. Learners may view their own qualifications, appraisals, and test results using the learner account. In addition, learners may appraise completed courses online, which may be used to improve course offerings. Based on the results of the learner's qualification matchup with a requirements profile, the learning system can automatically generate a suitable offering of courses. The personalized account for the learner that includes training activities, course prebookings, a notebook, a qualifications profile, a profile matchup, and a preferred learning strategy. Each of these areas may be accessed directly from the navigation window.

Figure 14:
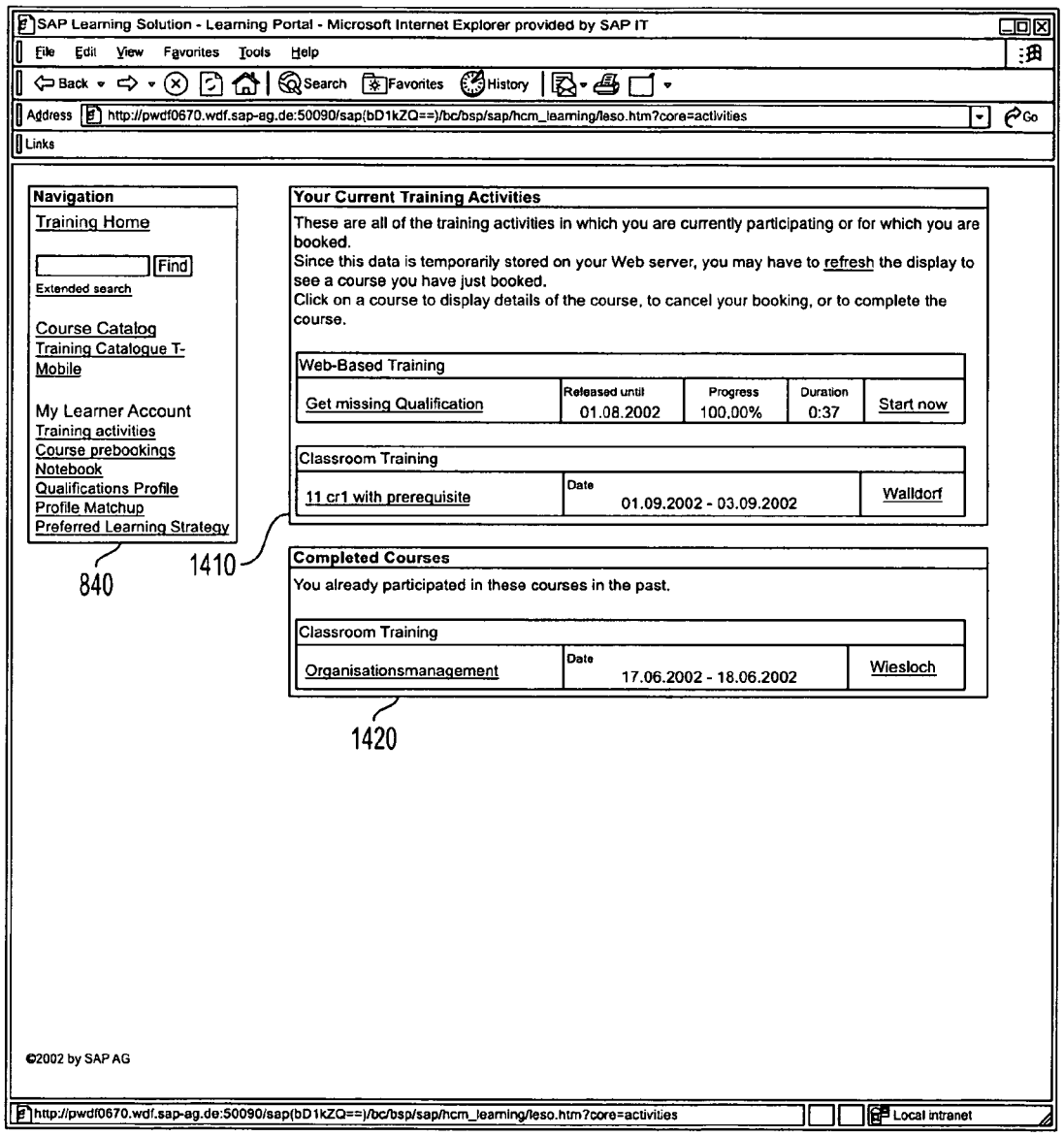

As shown in FIG. 14, the training activities window 1410 provides the learner with detailed information on training activities that are planned, in process, and completed. The training activities window may include a title and messages. The training activities may be classified as current training activities (e.g., courses displayed on the initial screen of the learning interface) and completed training activities. From the list of training activities, the learner may display courses and tests. In addition, current training activities may be divided into web-based and classroom training activities. A separate window 1420 may be provided for completed courses.

Figure 15:
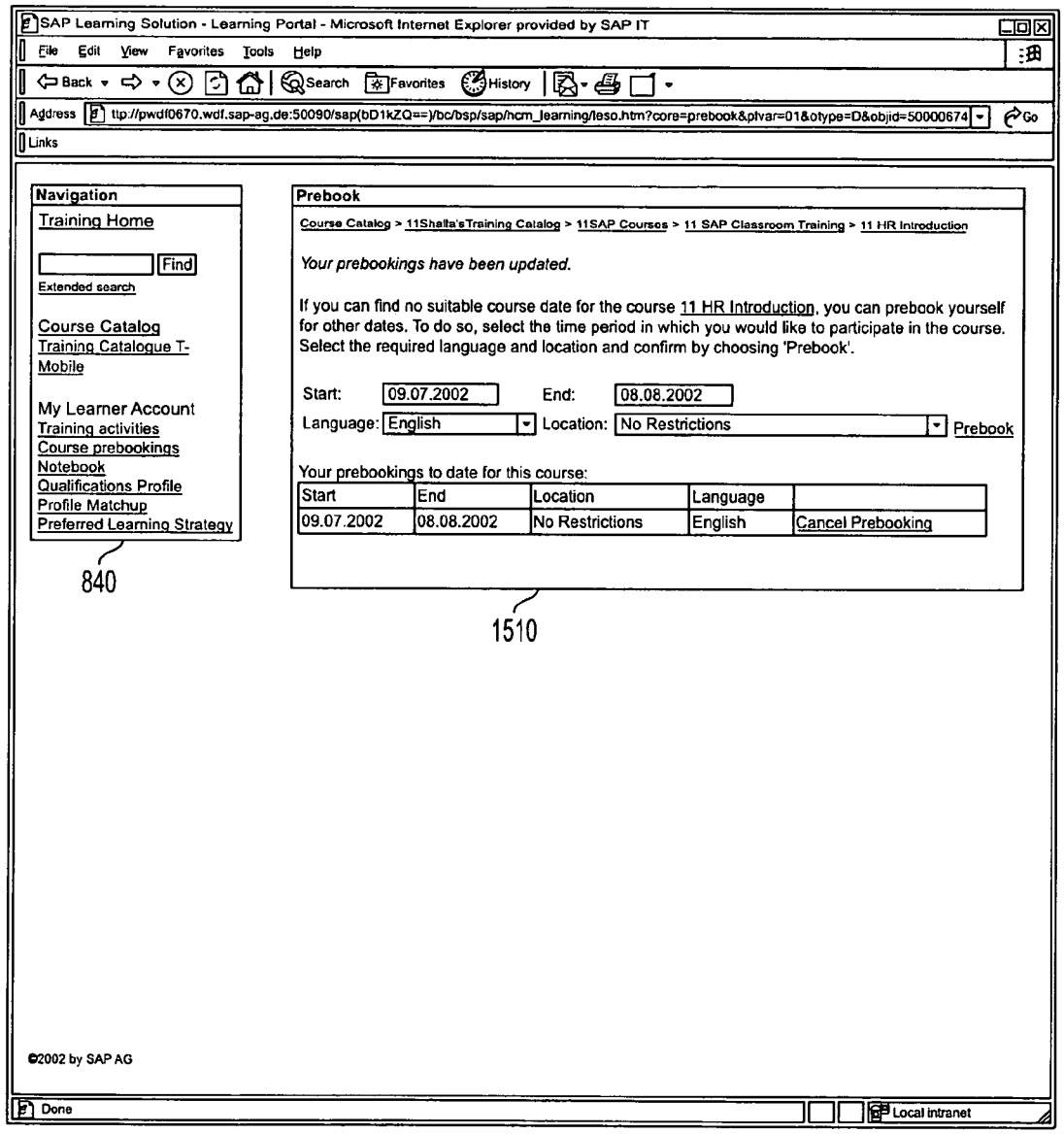

As shown in FIG. 15, a prebook window 1510 may be used to prebook a course that the learner is interested in taking if the current course offerings do not match those desired by the learner, for example, if the scheduled dates, languages, and/or locations of the offered courses are not suitable. The prebooking window allows the learner to propose alternative dates, course languages, and/or locations to the learning system. The learning management system monitors prebooked courses and may arrange to schedule or design a course if, for example, there is enough interest. The learner may be informed in the messages and notes window when a course is scheduled that meets the learner's requirements.

Figure 16:
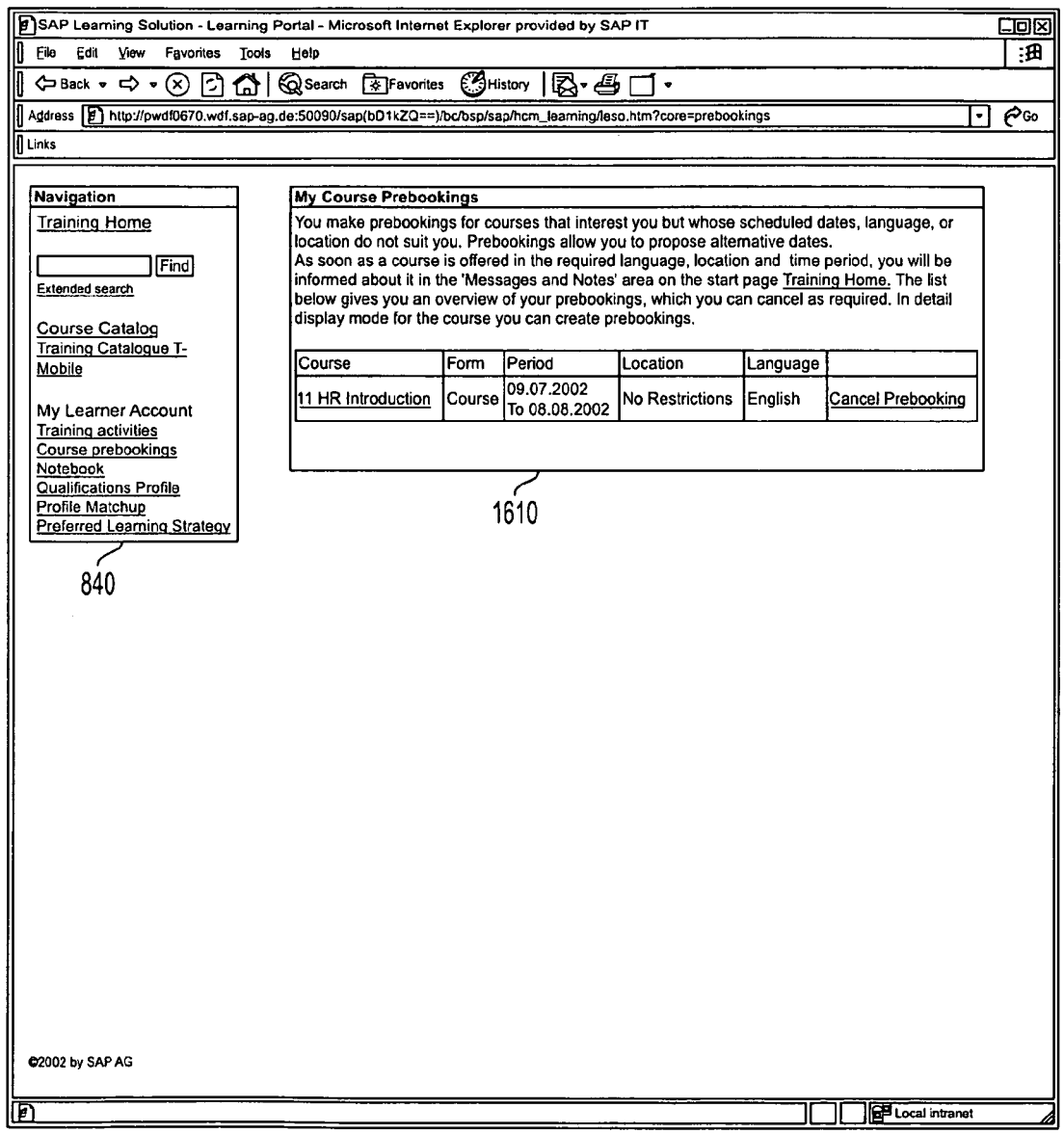

As shown in FIG. 16, the my course prebookings 1610 window lists current prebookings, which may be cancelled as required. The prebooked course list may include the course name, the period, the location, the language, and a hyperlink to cancel the prebooking.

Figure 17:
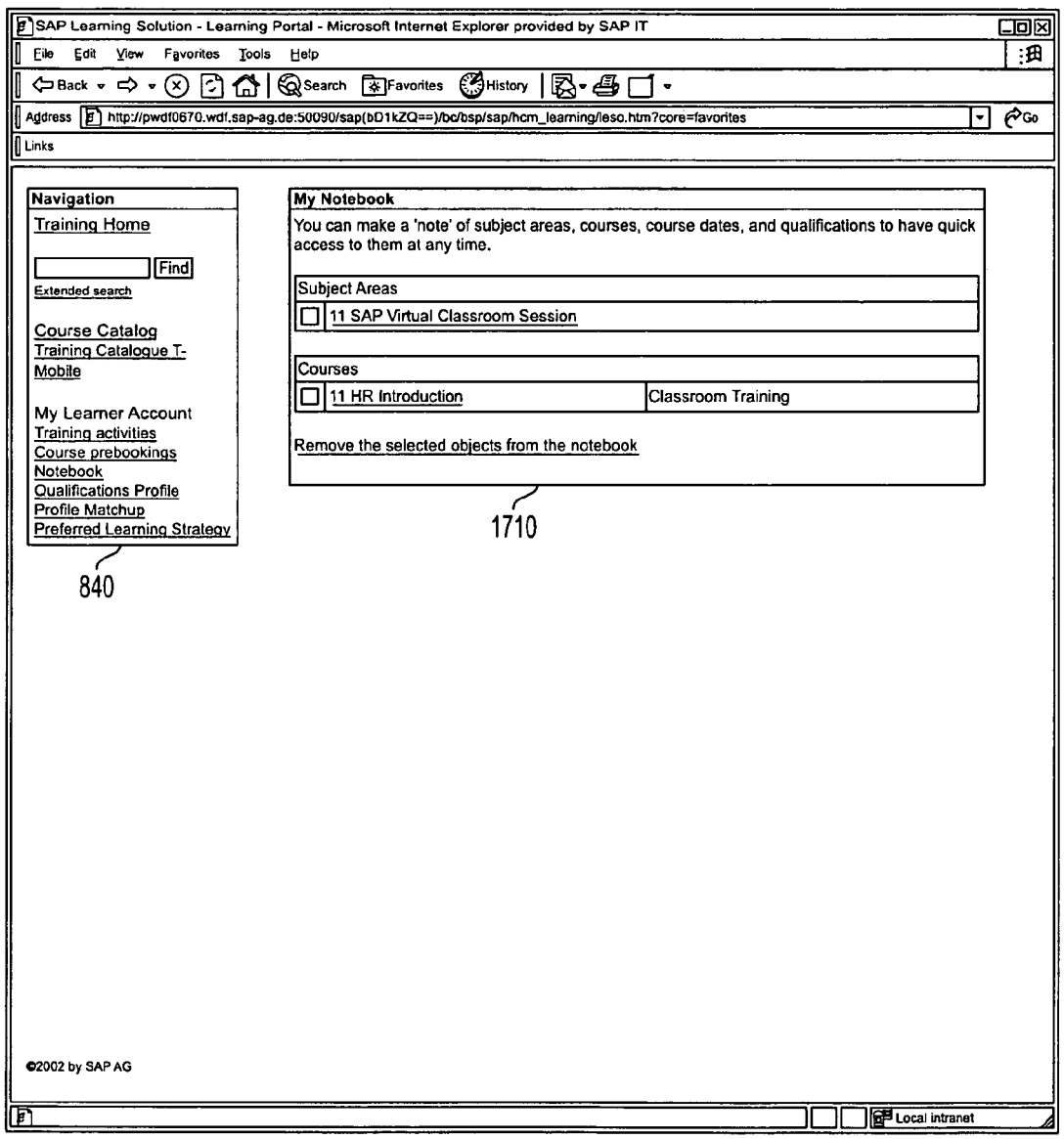

As shown in FIG. 17, the notebook window 1710 facilitates learner interaction with the learning system. Using the notebook, the learner may store and quickly access individual, learner-specific information. The notebook may include information for learner qualifications, subject areas, courses, and course dates. The notebook window allows the learner to view the individual areas within the notebook and add information of interest to the notebook and remove it as required (e.g., using the remove object hyperlink).

Figure 18:
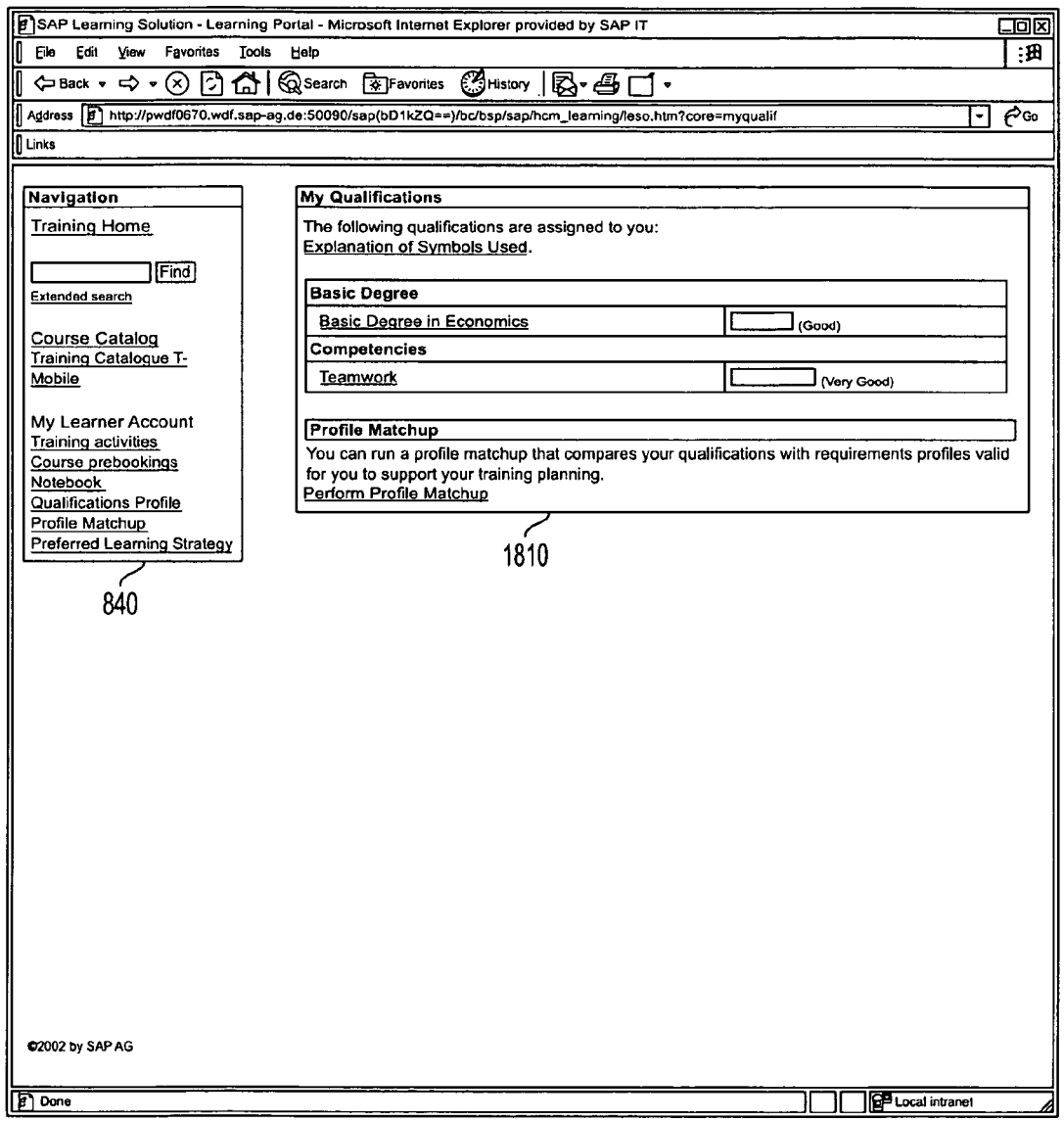

As shown in FIG. 18, the qualifications window 1810 describes qualifications that are assigned to a learner through the administration system. The qualifications are displayed in a list that is structured by qualification groups. The list also displays the learner's proficiency for each qualification. From the qualifications window the learner may access detailed information about any qualification. The display includes information about the meaning of the qualification (e.g., a description), the scale and value range on which the proficiency of the qualification is based, any qualifications defined as alternative qualifications, the learner's current proficiency, and course types that impart the qualification. A hyperlink to display an explanation of the qualifications may be provided. In addition, the learner may perform a profile matchup that compares the qualification with requirements profiles.

Figure 19:
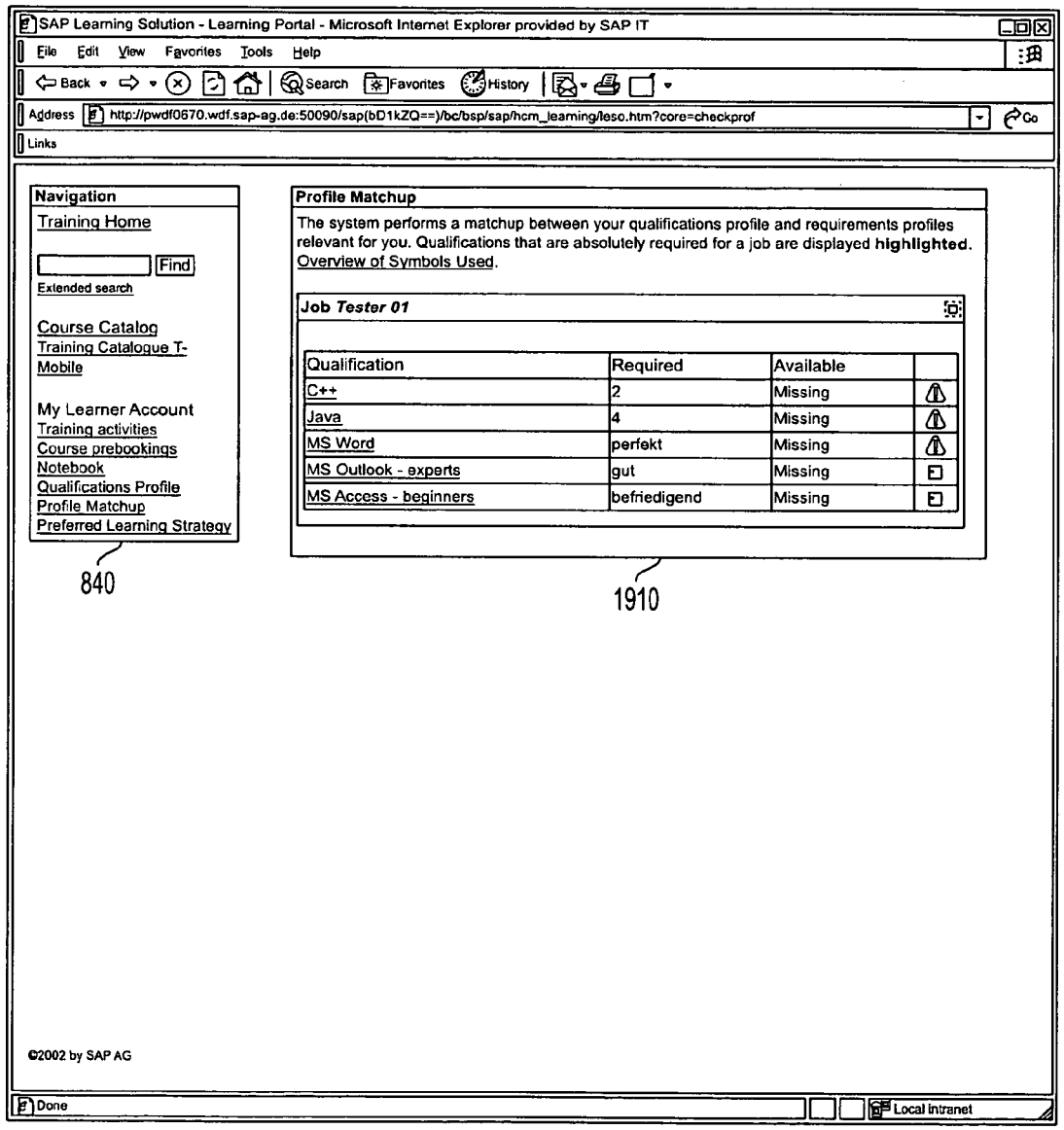

Selection of the profile matchup hyperlink (either from the qualifications window or the navigation window) displays the profile matchup window 1910, as shown in FIG. 19. The profile matchup window allows the learner to match their qualifications profile with various requirements profiles. The matchup window informs learners of any qualifications that need updating or qualifications need to be acquired. Using the profile matchup window, the learner is able to match qualifications with requirements profiles including requirements profiles of a learner's current position or job, a job for which a learner is designated, and/or a development plan to which a learner is assigned.

Figure 20:
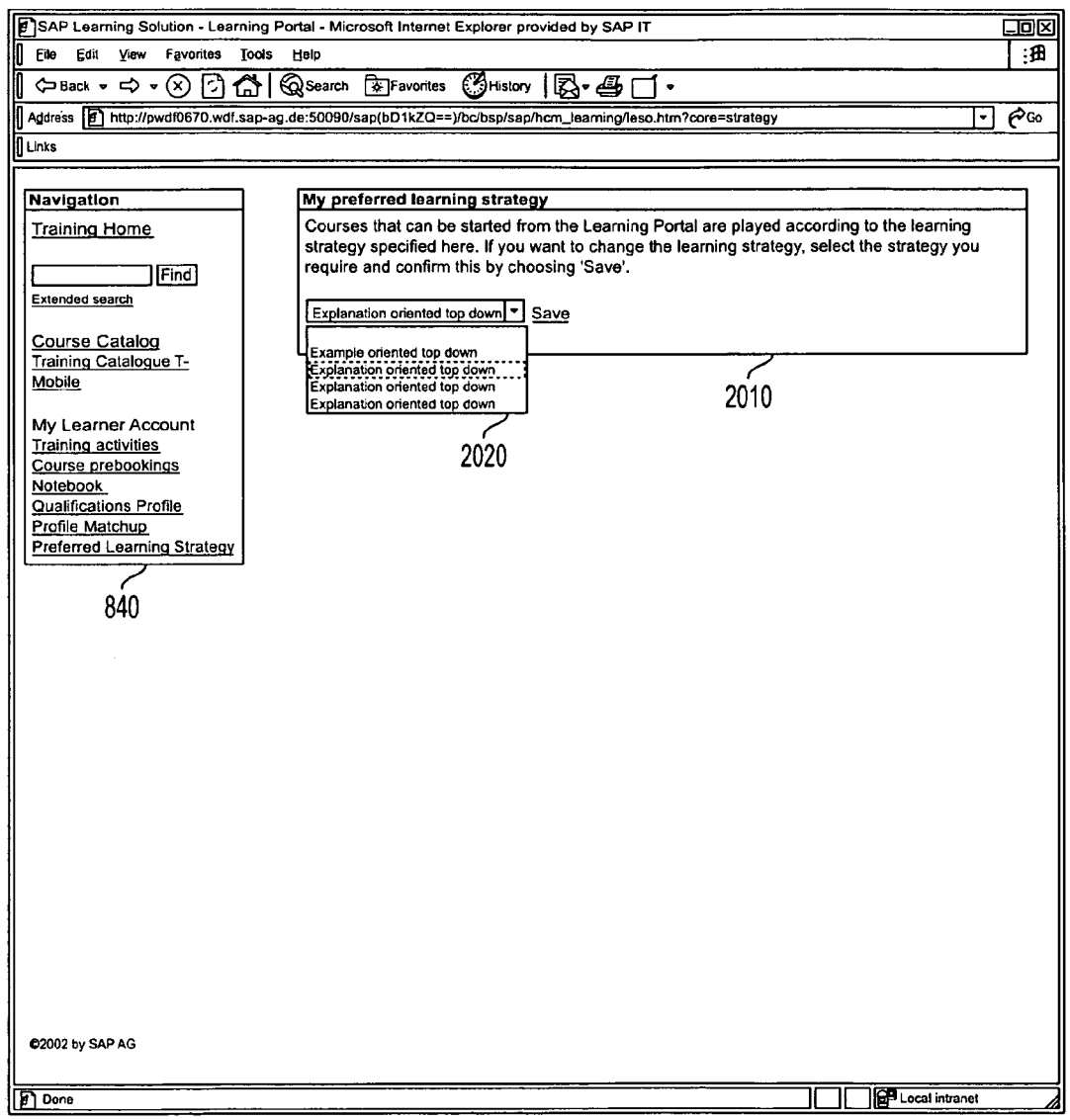

The learning administration system may be used to match a learner's qualifications profile with the requirements profiles to determine the learner's qualification deficit for the learner's current job, a job or position for which the learner is designated, or the learner's development plan. The learning administration system highlights any qualifications in the requirements profile that the learner does not have at all or does not have not with the required proficiency. The learner may access detailed information about any qualification from the qualifications display. As shown in FIG. 20, the learning strategy window 2010 allows the learner to choose from a number of learning strategies available. The learning strategy window may include learning macro strategies, micro strategies, and combinations of both macro and micro strategies. The learning strategies are described in detail above. The learner may select a learning strategy using a drop-down menu 2020.

Once an on-line or Web-based training course has been booked, a learner may proceed to take web based course using the learning station. When the learner is ready, the learner selects a web based course that has been booked and starts the course. The learning management system obtains the preferred learning strategy that is stored in the learner's account. In addition, the content player obtains the course content and structure from the content repository of the content management system. The content player guides the learner through the course using learner's selected learning strategy. The content player also dynamically adapts the number and sequence of topics contained in the course to learner's individual learning style using the selected learning strategy. The sequence in which content of course is presented to the learner also may be assembled on the basis of the learner's progress.

When a learner starts the course, the learning objectives and qualifications that have been achieved may be compared with the qualifications imparted by the course. As a result, the content player may selectively withhold redundant content for qualifications already achieved by the learner.

If the learner interrupts and then resumes a course, the content player opens the course at the point of interruption. Once a course has been successfully completed, the learning objectives that have been achieved are credited as qualifications to the learner's account in the learning management system.

Figure 21:
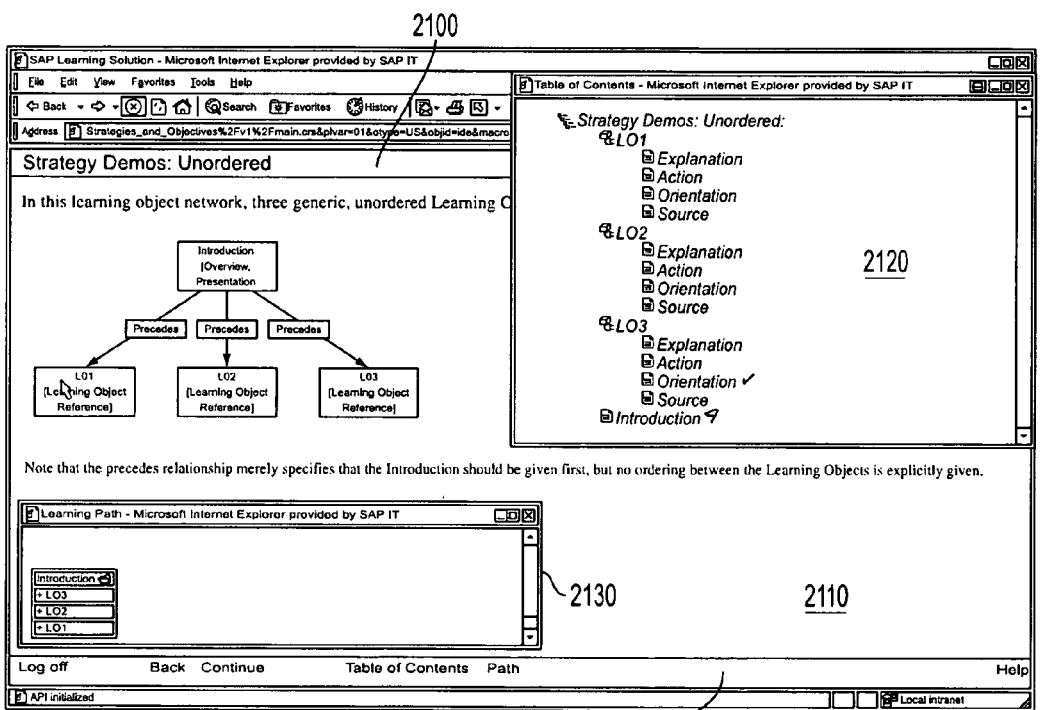

FIG. 21 shows a course screen 2100 that may be presented by the learner interface. The screen may include a content area 2110, a table of contents window 2120, a navigation path window 2130, and a navigation bar 2140.

As shown in FIG. 21, the subject of the course is displayed in the upper part of the learner interface screen. The course content may be displayed in the center content area. The navigation bar may be located across a lower portion of screen. There are a number of functions available to display the course in the learning interface. A learner does not have to proceed through the course in a linear fashion. Instead, the learner may jump between topics and content. The navigation bar may be used to activate all of the navigation functions to proceed through the course. Any of the navigation functions may be selected through use of a learner input device (e.g., a keyboard and cursor or clicking on a function using a pointer and a mouse).

The navigation bar may include the functions back, note, continue, table of contents, and path. Back may be used to return to the previous topic or content presented in the course screen. Note may be used to take into account navigation steps from other sessions. Continue may be used to move on to the next topic in the course. The table of contents may be used to display an overview of the content of a course. The path function may be used to display a navigation path through the course.

Selecting the table of contents function from the navigation bar causes the table of contents window to appear on the course screen. The table of contents window may be resized and dragged to any location on the screen. In addition, the window may be closed, minimized, and maximized. If all the contents of the window cannot be displayed in the window at the same time, a scroll bar is provided to access the contents. The table of contents window includes the course topics presented in the sequence in which the author created them. This sequence is independent of the learning strategy selected. Entries in the table of contents that a learner may access may be highlighted in color and/or identified by a symbol. Access to these entries depends on the completion status of the course elements and the learning strategy selected.

Selecting the path function from the navigation bar causes a navigation path window to appear on the screen. The navigation path window may be resized and dragged to any location on the screen. In addition, the navigation path window may be closed, minimized, and maximized. If all the contents of the navigation path window cannot be displayed at the same time, a scroll bar is provide to access the contents. The navigation path window may be used to see the learner's exact location within a course. The navigation window includes a navigation path of the structural elements of the course and depends on the learning strategy selected. The learner may navigate to structural elements displayed on the navigation path (and any associated content) by selecting the structural element.

The topic or name of the content currently presented in the content area is displayed in the upper part of the course screen. One or more indicators may be appended to the topic or name, for example, currently in process, completed or displayed, completion is not yet recommended, the element is a test element.

To exit the course, the learner may choose the Log off function from the navigation bar. Once the logged off, the achieved learning objectives are entered in the learner account. The learning administration system stores the point at which the course was interrupted to ensure that the learner can resume the course at the same point.

Figure 22:
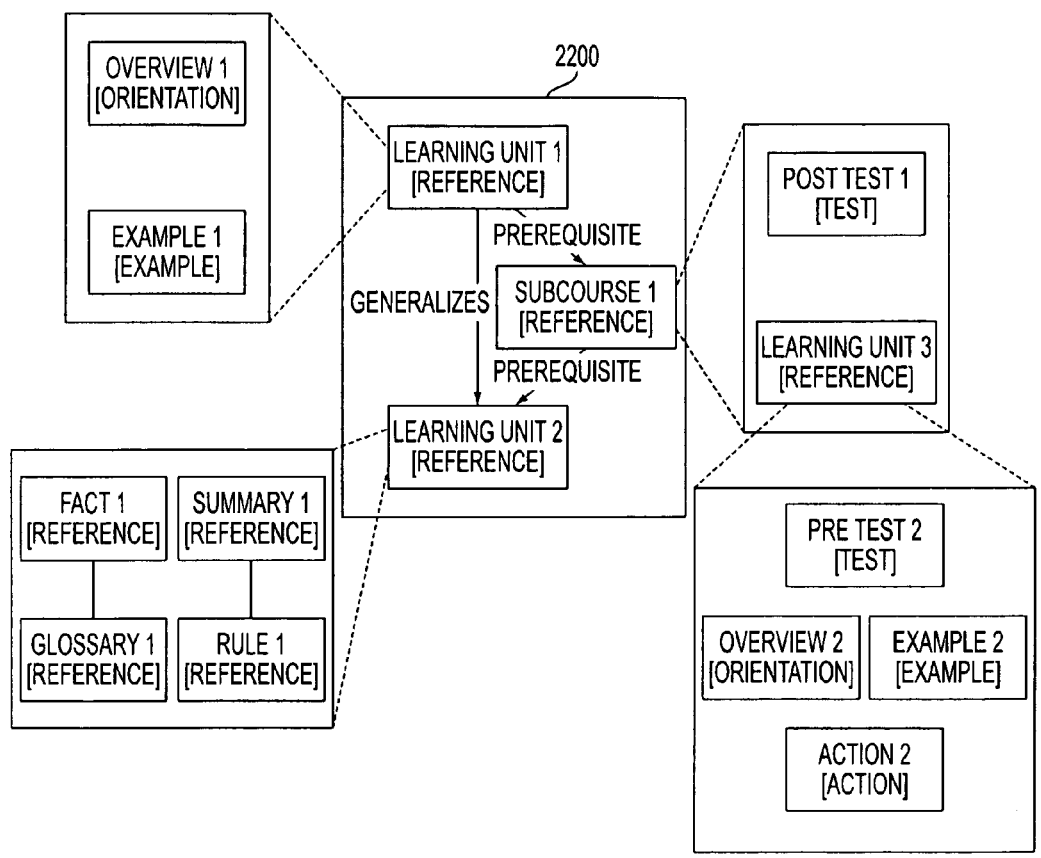
FIG. 22 is an exemplary course.

FIG. 22 is a graphical representation of a course 2300 that may be used to illustrate the construction of navigation paths in FIGS. 23–27. As shown in FIG. 22, a course 2300 includes a learning unit 1, sub course 1, and learning unit 2. Learning unit 1 includes two knowledge items: overview 1 and example 1. Sub course 1 includes post test 1 and a learning unit 3. Learning unit 3 includes knowledge items pretest 2, overview 2, example 2, and Action 2. Learning unit 2 includes the knowledge objects fact 1, glossary 1, summary 1, and rule 1.

Each of the structural elements includes a type of knowledge attribute (shown in brackets). For example, Fact 1, Summary 1, glossary 1, rule 1, learning unit 1, learning unit 2, learning unit 3, and sub course 1 all include knowledge of reference. Overview 1 and overview 2 include knowledge of orientation. Example 1 and example 2 include knowledge of example. Action 2 includes knowledge of action.

A number of relations are provided between the structural elements. The directional relation "is a prerequisite of" is provided from learning unit 1 to sub course 1 and from sub course 1 to learning unit 2. The directional relation "generalizes" is provided from learning unit 1 to learning unit 2. The Non-directional relations "belongs-to" are provided between fact 1 and glossary 1 and summary 1 and rule 1.

In order to guide a learner through the content of a course associated with the structural elements, a navigation path is generated by the content player based on the learning strategy selected by the learner. The navigation path displayed in the navigation path window may be divided into two portions. A lower portion shows the structural elements that may be reached from the learner's current position within the course. A bar above this portion shows all of the knowledge items within a structural element that is currently being navigated by the learner. A dark color or highlight may be used to indicate the knowledge item and structural element associated with the content that is being presented by the content player.

A number of symbols may be associated with the structural elements to convey information to the learner. Symbols may be useful to individuals who have difficulty distinguishing colors on the screen. For example, an open folder may be used to indicate the structural element is currently being accessed or displayed. A check mark may be use to indicate a structural element that has been completed and/or presented to the learner. A lock may be used to indicate that navigation to a structural element is not recommended at that point in the course. Four buttons in a square may be used to indicate an uncompleted test element.

Figure 23:
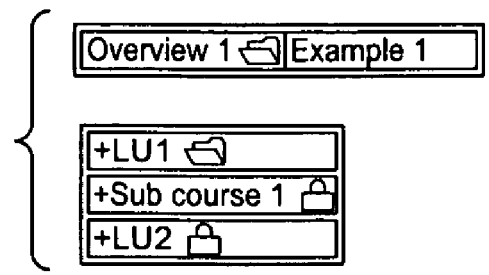
FIGS. 23–27 an exemplary navigation paths.

As shown in FIG. 23, a navigation path is generated for the course shown in FIG. 22 using a top down macro learning strategy. The three structural elements learning unit 1, sub course 1, and learning unit 2 are shown in the lower portion of the navigation path window. A dark color and folder symbol indicate learning unit 1 and overview 1 are being accessed or viewed. The bar above the lower portion shows the knowledge items overview 1 and example 1 within in the learning unit 1. As shown in FIG. 23, learning unit 1 has not been completed. In addition, learning unit 1 is a perquisite for sub course 1 and learning unit 2. As a result, lock symbols are displayed on sub course 1 and learning unit 2 to indicate navigation to these elements is not recommended.

Figure 24:
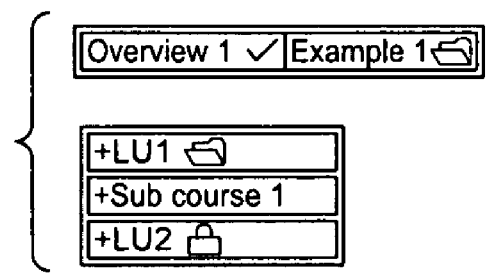

As shown in FIG. 24, the knowledge item overview 1 and example 1 have now been completed. As a result, sub course 1 is offered (i.e., the lock symbol is removed), however, the lock symbol remains on learning unit 2 (i.e., because the completing sub course 1 is a prerequisite for beginning learning unit 2).

Figure 25:
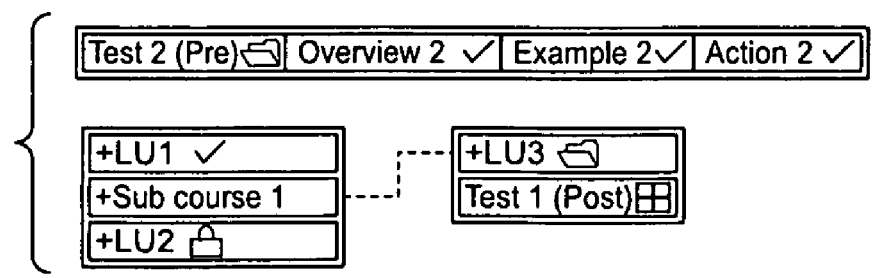
Figure 26:
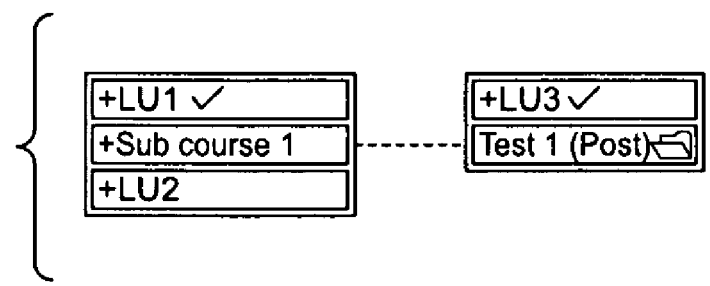

FIG. 25 shows the learner has navigated to sub course 1. The structural elements learning unit 3 and test 1 within sub course 1 are displayed next to the course structural elements. A dotted line may be shown to indicate which structural element includes the second set of structural elements. The bar at the top shows the knowledge items within the learning unit 3 (i.e., test 2, overview 2, example 2, and action 2). The check marks indicate that the knowledge items have been completed. The four buttons next to test 1 indicate the test has not been completed. As a result, learning unit 2 is still not offered. As shown in FIG. 25, the learner has completed Learning unit 3 and test 1. As a result, as shown in FIG. 26 the prerequisites for learning unit 2 have been completed and the lock is removed from learning unit 2. No bar is shown at the top of the display because the test 1 does not contain any knowledge items.

Figure 27:
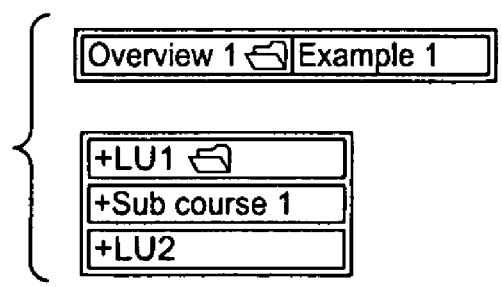

As shown in FIG. 27, using the navigation strategy index, all relations are ignored. As a result, all elements are offered in the navigation path.

Offline E-Learning

In another implementation of the learning station 610, a learner may take a course offline. Offline E-learning may be used to process courses (e.g., tests and courses) offline, locally at the learning station 610 without being connected to the learning system 620. The learner may continue training even when the learner is unable to maintain an online connection (e.g., when traveling or when a location has no online access). As a result, the learner is provided with greater flexibility and control over how to plan and manage their training.

Figure 28:
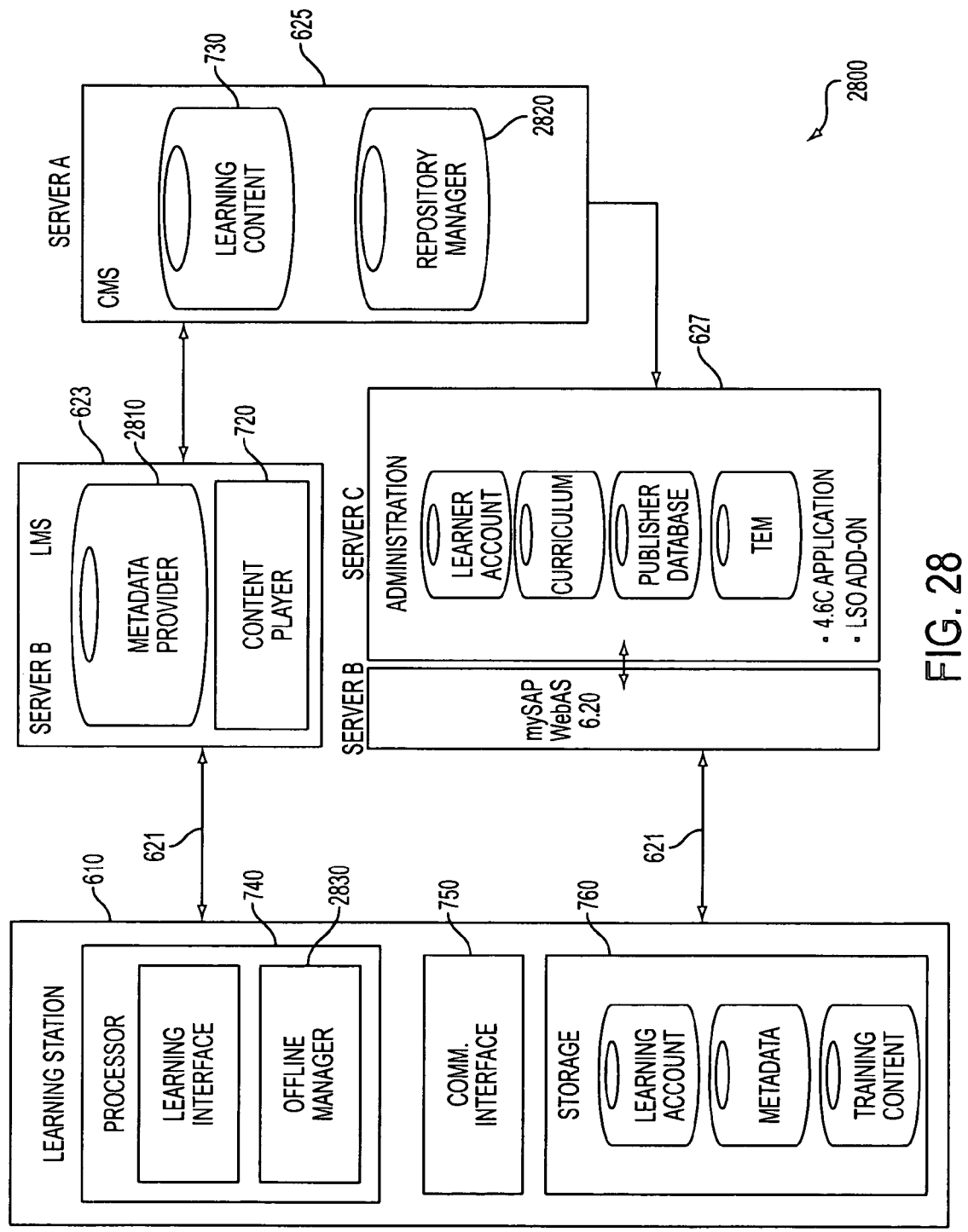
FIG. 28 is an exemplary block diagram of a learning system for offline learning.

As shown in FIG. 28, an offline E-learning system 2800 may include a learning management system 623, a content management system 625, and a learning administration system 627. The learning management system 623 may include a content player 720 and a metadata provider 2810.

The content management system 625 may include a learning content storage 730 (e.g., the content repository) and a repository manager 2820. In addition, the learning station 610 may include an offline manager 2830 and a storage 760 for offline data (e.g., an offline learning account, metadata, and courses).

Offline courses are derived from the published on-line courses. A curriculum manager may determine which content and courses may be provided offline. An indication (e.g., a flag, a signal, or a token) may be added to the course catalog of the learning administration system 627 to indicate if a course also is offered offline. In addition, a reference to a generic packaging list including learner independent metadata for the offline course may be associated with the course. Any courses that are indicated as being offered offline by the course catalog may be booked by a learner using the learning interface, as described above. If a learner chooses to take a course offline, the course material is assembled and downloaded to the learning station 610, as described in detail below.

A copy editor may create offline courses from published courses offered online using the repository manager 2820. The repository manager 2820 may be used to create the generic packaging list associated with the course that is offered offline. The generic packaging list includes access paths and learner independent metadata of all files that are part of the offline course that are not learner specific. For example, the generic packaging list may be used to indicate the content files that are downloaded to the learning station 610 to allow the learner to take the course offline.

Additional metadata specific to the learner and the offline course are derived from centrally administered learner specific metadata. The learner specific metadata is used to create a learner specific packaging list that is created once the learner decides to take the course offline, as described in further detail below.

Figure 29:
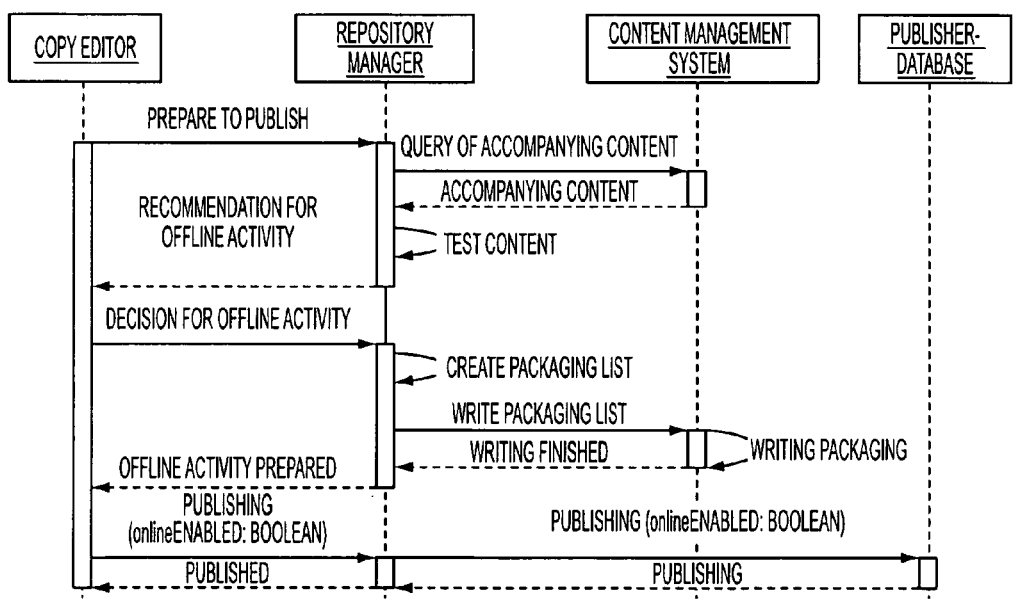
FIG. 29 is an exemplary process for creating an offline course.

In one implementation, an offline course may be created as shown in FIG. 29. The copy editor may decide to create an offline offering of a course at the time of publication of the course. In order to offer a course offline, the copy editor accesses the repository manager 2820 to query the content repository of the content management system 625 and determine what content is associated with the course. Using the content identified in the content repository, the repository manager 2820 may perform a test to determine whether all of the structural elements of a course are available on the content management system 625 (e.g., in a distributed system that includes more than one content management system 625, it is possible for individual structural elements or access paths of structural elements to be located on external servers).

Based on the results of the test, the copy editor may decide whether the course is suitable to be offered offline. If it is determined that the content is suitable to be offered offline (e.g., all of the structural elements associated with the course are available), the repository manager 2820 creates the generic packaging list for the course. After creating the generic packaging list, the repository manager 2820 writes the generic packaging list associated with the offering the course offline to the content repository. Once the generic packaging list has been stored in the content repository, the repository manager 2820 notifies the copy editor, and the copy editor instructs the repository manager 2820 to publish an indication, such as a flag, that the course is offered offline in the publisher database (e.g., the course catalog) of the learning administration managing system. A reference to an access path for the generic packaging list is included in the publisher database during publishing.

The learning station 610 may be provided with an offline manager 2830 that is implemented by the processor of the learning station 610. The offline manager 2830 operates in conjunction with the learning station 610 browser to present and supervise any offline training. In addition, the storage of the learning station 610 stores data and files for an offline learning account, offline metadata, and one or more offline courses. An offline manager interface is provided for the learner to interact with the offline manager 2830. The offline manager interface may be used to present, manage, and start the offline training.

To track the learner's progress while offline, a local course state is saved for any offline course that is presented to a learner. The local course state may be used to keep track of what tests, courses, structural elements within a course have be viewed or completed. The local course state also may keep track of competencies, qualifications, and proficiencies that are gained or modified from the offline training. The local course state is stored in the offline learning account (e.g., using a training participation document (TPART-DOC)). The local course state may be synchronized at specified times with a corresponding central learning or course state (e.g., stored in the learning account in the learning administration system 627) so that the learner's processed course material is always in a consistent state.

For example, a learner may begin a course online and then decide to continue working on the course offline (if the course is offered offline). The learner's central learning state may be stored or synchronized with local course state stored in the offline learning account. Likewise, a learner may work on a course offline and then continue to work on the course online. In this case, before the learner begins to work on the case online, the centralized training state is synchronized with the local course state stored in the local learner account. By synchronizing the local course state and the central learning state, the learner may switch back and forth between online and offline training, if desired.

To begin offline training, the offline manager 2830 requests that a copy of the learner's learning account be transferred to the learning station 610. The copy of the learning account is stored in the offline learning account. In addition, the offline manager 2830 requests a learner specific packaging list for the course that is desired to be taken offline. Using the learner specific packaging list, corresponding content files and metadata are downloaded to the learning station 610 and stored in the offline course content and metadata storage, respectively.

Figure 30:
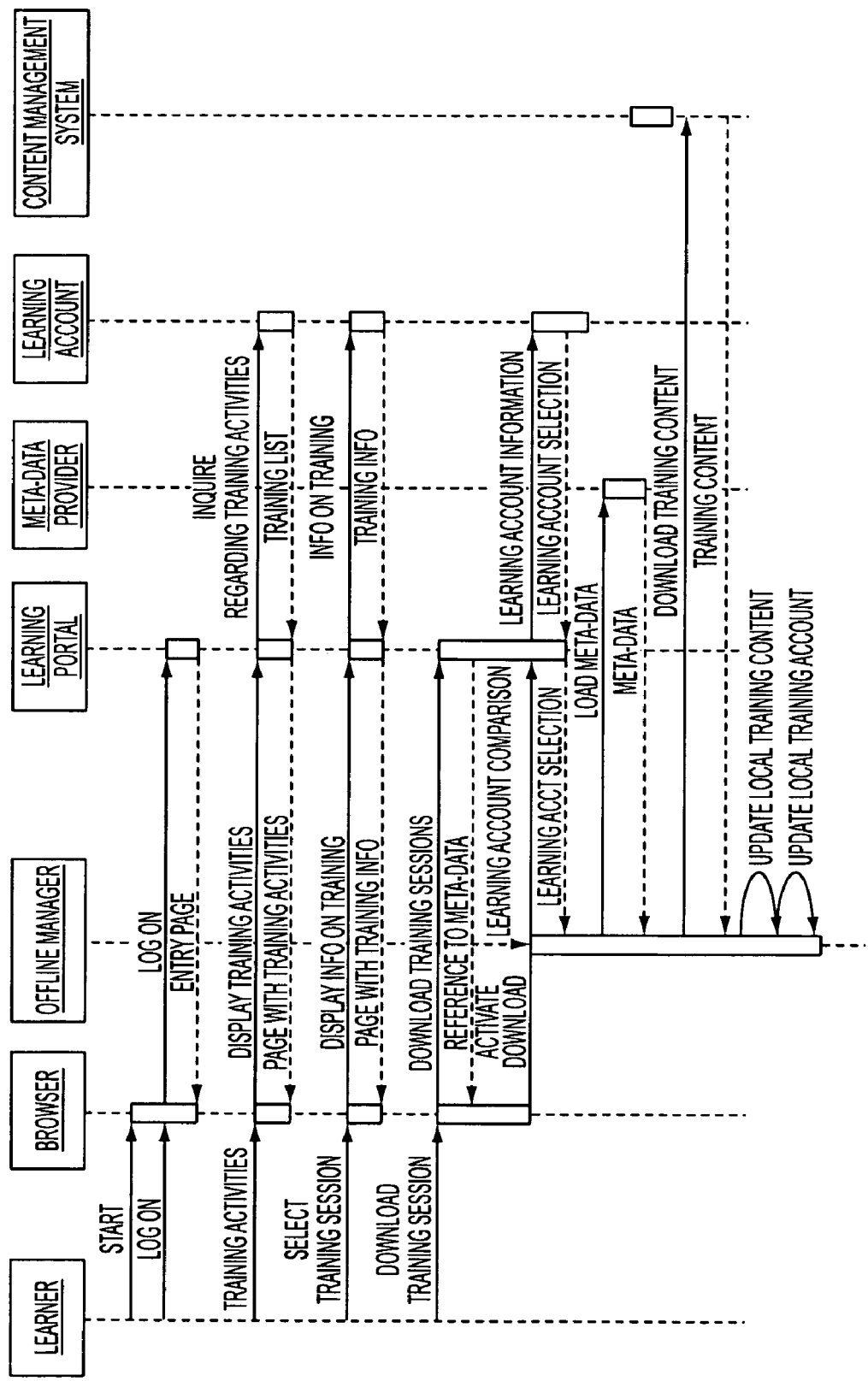
FIG. 30 is an exemplary process for downloading offline course.

FIG. 30 shows one exemplary process to download a course for offline training. The learner starts the browser and learning interface of the learning station 610. Once started, the learner may request that the learning interface connect to the learning system 620 (e.g., log on to the learning system 620). The learning management system 623 provides the initial course screen of the learning interface. Using the learning interface, the learner may determine if a course is offered offline (e.g., the learner may search for a course using the course catalog or the find feature from the navigation window).

If the course is offered offline, the learner may select the course from the training activities window, the course catalog, or other navigation window of the learning interface in the same manner that learner would select an online course. In addition, the learner may view information about the course. For example, the browser may submit a request for information corresponding to the offline course to the learning management system 623. The learning management system 623 queries the learning administration system 627 to obtain the training information from the published database. The learning management system 623 returns a page with the relevant course information for display by the learning interface.

The learner may select the offline course using, for example, a hyperlink provided by the learning interface. Selecting the offline course (e.g., selecting the hyperlink) causes the learning management system 623 to determine the generic packaging list associated with the course using the reference stored in the administration management system. The access path to the offline course including the generic packaging list is provided to the learning station 610.

To begin downloading the offline course, the learning station 610 contacts the content player 720 of the learning management system 623 using the access path for the offline course (e.g., a URL) including information about the generic packaging list. In addition, this access path provides the content player 720 with parameters that are specific to the learner (e.g., the training participation identification and the learning strategies to be applied when taking the offline course). The content player 720 forwards the request to the metadata provider 2810, which runs in the same learning management system 623. The metadata provider 2810 determines the learner specific metadata and provides the learning station 610 with a learner specific packaging list by merging the generic packaging list with the learner specific metadata. For example, the learner specific packaging list may consist of macro/micro strategy preferred by the learner, the TPARTDOC, and resource reference.

The meta-information in the learner specific packing list is coded as a special data type (e.g., a MIME type for which the offline manager 2830 may be registered automatically when installing the offline manager 2830 or set manually by the user when first downloading this data type). In response to receiving the special data type from the learning management system 623, the learning station 610 activates the offline manager 2830, which copies all necessary information to the learning station 610 by interacting with the content management system 625. Using the learner specific packaging list, the offline manager 2830 accesses the content management system 625 to download the course content files specified by the learner specific packaging list associated with the offline course. The content files and any resources of the course are copied to the local storage of the learning station 610 successively and may be compressed, for example, using a zip file or any other format suitable for storing and compressing segments of a file system. This process may be repeated to download multiple offline courses.

The offline manager 2830 also requests the learner's central learning account information. The central learning account information is compared with the offline learning account information, and the local learning account information is synchronized with the centralized learning account information and stored in the offline learning account.

Figure 31:
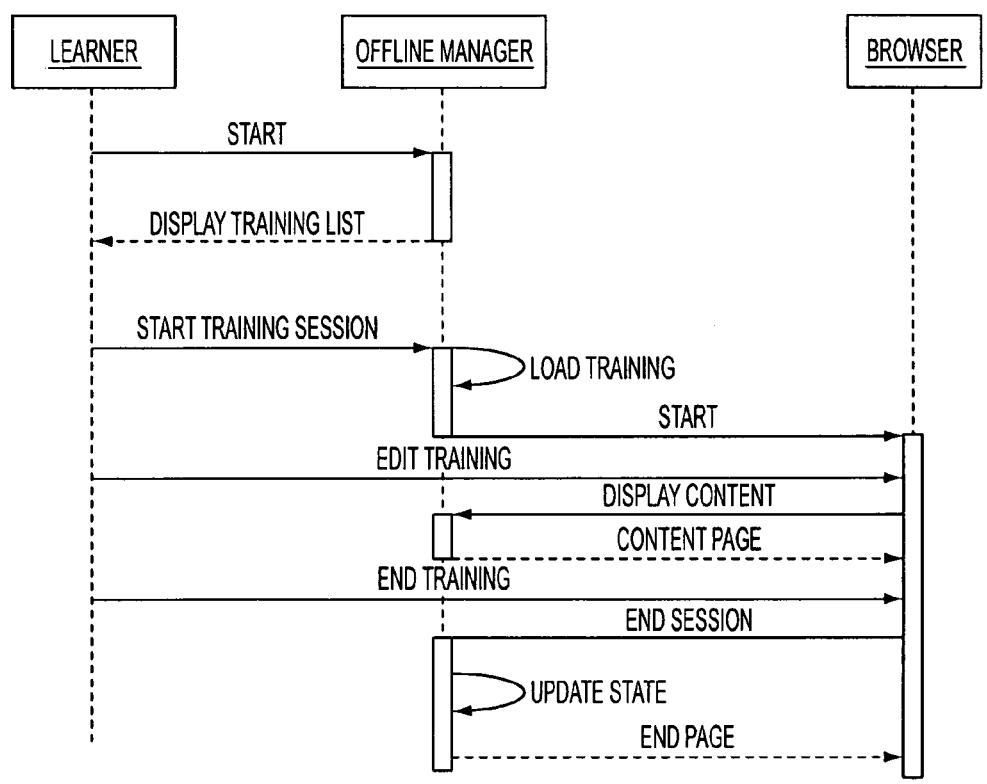
FIG. 31 is an exemplary process for processing an offline course.

A process for offline training in shown in FIG. 31. In the offline mode, the offline manager 2830 takes on both the function of the learning management system 623 and the content player 720. The offline manager 2830 is provided with an appropriate version of a content player to play the course in the offline mode. The offline content player may be used to present the course to the learner in addition to applying a selected learning strategy in the same manner that a learner would be presented with a course online.

For example, the offline manager 2830 displays the list of the available offline courses using the offline manager user interface. The learner may select a course from the course list displayed by the offline manager user interface. After selection and activation of the course, the content is loaded in an updated processing state. The browser is launched with the updated content resource. Processing occurs parallel to the online mode, i.e., the learner uses the browser-based learning interface in the same manner with which he or she is familiar for taking online course. The content is displayed by the learning interface and the learner interacts with the course. When the offline training session ends, the offline manager 2830 updates the local training state (or the offline manager 2830 may update the local training state as the learner interacts with the course).

The offline manager 2830 controls the coordination of several embedded components, fore example, a download manager, a synchronization manager, an offline storage manager, and an offline content player. Under some circumstances, the embedded components, e.g., a download manager that is in charge of downloading course content files, executes long-term actions, such as the download of course content files. In such cases, the system must provide visible feedback to the learner informing her that such a long-term action is currently executed (e.g., by displaying an information dialog with a progress bar). The embedded components, however, do not implement these user interface related feedback functions themselves, but rather use an programmatic interface for which the offline manager 2830 provides the appropriate implementation. From that point of view, all user interface related interactions are implemented in the offline manager 2830.

Figure 32:
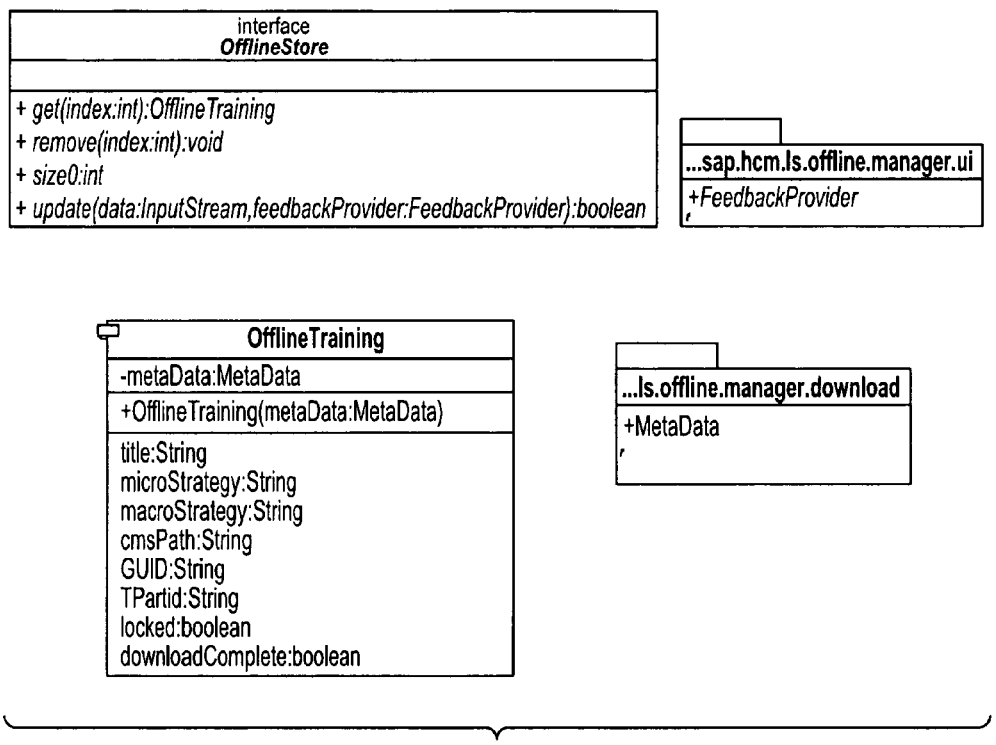
FIG. 32 is an exemplary offline store class diagram.

The offline storage manager provides the course listing, which may include all locally stored courses and manages the meta-data for each course. For example, the offline storage manager determines and tracks which courses are currently locked, i.e., which are currently viewed online and thus cannot be started offline, which courses have been completely downloaded, and which courses are closed (e.g., the learner has decided to not use them in offline mode any longer and, thus, are safe for deletion). FIG. 32 shows examples of the data stored in the offline storage of the learning station 610 that are used by embedded components of the offline manager 2830 for individual offline courses.

Course content and associated metadata downloaded for the offline course may be stored at the learning station 610 in compressed or packed form. The downloaded course content is accessed by the offline content player to present the course to the learner.

As described above, metadata are stored at the learning station 610 for each course to ensure the conformity between local training state of the course and the learner's account and the central (e.g., online) training state of the course and the learner's account. For example, the training participation document (TPARTDOC or TPARTID) includes an Id that identifies a learner for a booked course. The TPARTDOC also is used to help conform the offline session with the central learning account and online sessions. Metadata is also used to control the presentation of the course to the learner by the offline content player (e.g., specifying a learning strategy to use to present the course).

Figure 33:
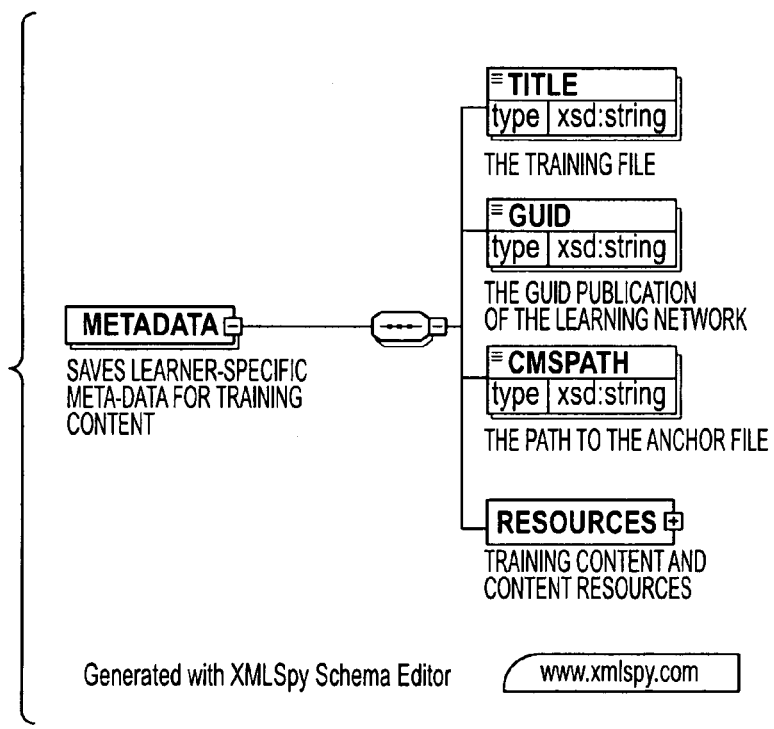
FIG. 33 is exemplary learner independent metadata for offline training.

The metadata may be divided into two groups: learner-specific and learner-independent. The learner-independent data is used to form the generic packaging list. As shown in FIG. 33, the learner-independent metadata may include: a TITLE, a global unique identifier (GUID), a CMSPATH, RESOURCES, and a RESOURCE. The TITLE includes the offline course title.

The title may be used by the offline manager 2830 to display a course in the list of available offline courses.

The GUID includes the publication GUID of the course material, which assigns it to a course in the course catalogue. The GUID may be used to uniquely identify the location where the content and resources for the offline course are stored (e.g., by including the GUID in the name of the ZIP file provided to the learning station).

CMSPATH saves the access path to the "anchor object" of the course, which is loaded when the learner starts viewing that course.

RESOURCES is the list of resources (course or content resources), which are required for processing the course in the offline mode. The base URL of the content management system 625 is stored in the base attribute. RESOURCE contains information on an individual resource. The relative URL specifies the location of the resource in the content management system 625. When downloading a resource, the download manager computes the full access path by appending the relative resource URL to the base URL of the content management system 625. The size (in bytes) can be shown in the attributes size and the resource data type as mimetype.

Figure 34:
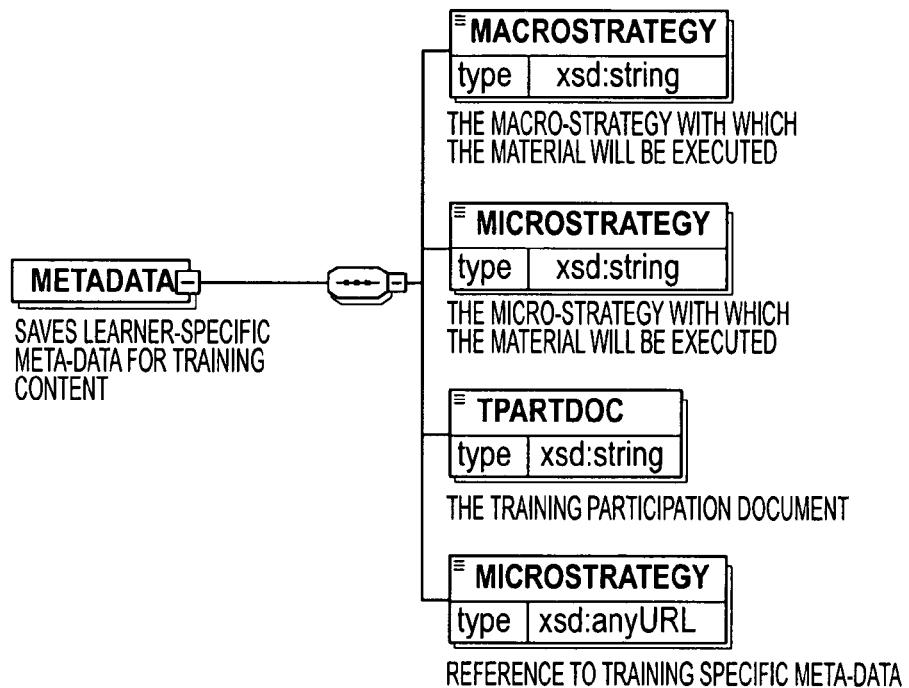
FIG. 34 is exemplary learner specific metadata for offline training.

As shown in FIG. 34, the learner-specific elements of metadata include a TPARTDOC, a MACROSTRATEGY, a MICROSTRATEGY, and a RESOURCEREF. The TPARTDOC serves for retrieving the training information from the learner account (e.g., completed items, completed tests, scores, qualifications, competencies, proficiencies, and goals), which may be used to ensure conformity between the central database for a learning account and the offline learning account. The MACROSTRATEGY identifies any macro-strategy, which is to be used for the processing of the offline course. The MICROSTRATEGY identifies any micro-strategy, which is to be used for the processing of the offline course. The learning strategies may be applied to the course in the same manner as applied by the content player 720 of the learning management system 623. The RESOURCEREF contains a link to the learner-independent package list. This link is generated by the meta-data provider during the process of generating the learner specific package list and serves as a back reference to the original generic package list. FIG. 35 is an example of a learner specific packaging list that is created by merging the generic packaging list with the leaner specific metadata.

Figure 36:
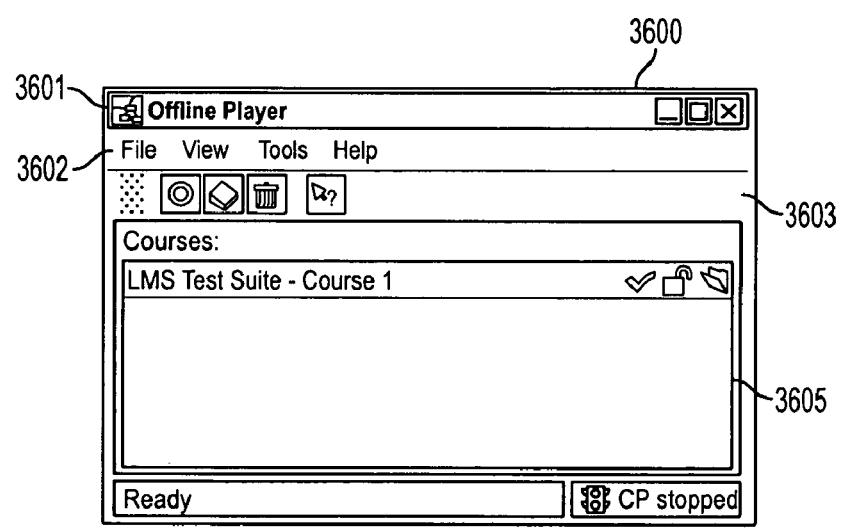
FIG. 36 is an exemplary offline manager interface.

As shown in FIG. 36, the offline manager interface screen 3600 includes a title bar 3601, a menu bar 3602 with one or more drop down menus, a tool bar 3603, and a main content screen 3605. The drop down menu 3602 may be used to change local settings (e.g., proxy settings for download and synchronization manager) and to delete courses. The titles of all locally available courses are displayed as a list or icons on the main content area of the screen. A scroll bar may be provided if the entire list may not be display at the same time. The desired course may be selected from the list.

The list also may include a number of icons associated with each course, for example, a check mark, a lock, and a folder. The check mark may indicate the course has been completed. A closed lock may indicate that the course may not be accessed, for example, because the course is being presented online. An open lock may indicate that the course may be accessed/viewed offline. An open folder symbol may indicate that the course is available for offline usage. A closed folder symbol may indicate that the course has been closed for offline use and that the downloaded files can be safely deleted.

Selecting the course starts the offline content player. The offline content player interacts with the browser of the learning station 610 to present the course to the learner in the same manner as an online course is presented. A stop and go light may be used to indicate whether the offline content player is active (e.g., red indicating the offline content player is stopped and green indicating the offline content player is presenting a course.)

Course Navigation

The structure of a course is made up of a number of graphs of the structural elements included in the course. A navigation tree may be determined from the graphs by applying a selected learning strategy to the graphs. The navigation tree may be used to navigate a path through the course for the learner. Only parts of the navigation tree are displayed to the learner at the learning portal based on the position of the learner within the course.

As described above, learning strategies are applied to the static course structure including the structural elements (nodes), metadata (attributes), and relations (edges). This data is created when the course structure is determined (e.g., by a course author). Once the course structure is created, the course player processes the course structure using a strategy to present the material to the learner at the learning portal.

To process courses, the course player grants strategies access to the course data and the corresponding attributes. The strategy is used to prepare a record of predicates, functions, operations, and orders that are used to calculate navigation suggestions, which is explained in further detail below.

The content player 720 accesses files (e.g., XML files storing course graphs and associated media content) in the content repository and applies the learning strategies to the files to generate a path through the course. By applying the learning strategies the content player 720 produces a set of course-related graphs (which is simply an ordered list of nodes) that are used to generate a navigation tree of nodes. The set of nodes may be sorted to generate an order list of nodes that may be used to present a path through the material for a learner. The embedded LMS 760 also may generate paths in the same manner. In general graphs and strategies may "interact" in the following ways:

1. A strategy implements a set of Boolean predicates that can be applied to graph nodes. For example: isCompleted (node).

2. A strategy may be informed by an event that some sort of action has been performed on a graph node. For example: navigated(node).

3. A strategy may provide functions that are used to compute new node sets for a given node. For example: NavigationNodes(node).

4. A strategy provides an ordering function that turns node sets computed number 3 into ordered lists.

5. A strategy may decide to alter certain strategy-related node attributes. For example: node.setVisited(true).

Note that the last point is used because a strategy does not keep any internal state. Instead, any strategy-related information is stored in graph nodes' attributes allowing strategies to be changed "on the fly" during graph traversal.

As described there are sets of nodes that may be used to generate a path through a course. One set of nodes is "navigation nodes." Navigation nodes may include all nodes that the strategy identifies that may be immediately reached from the current node. In other words, the navigation nodes represent potential direct successors from a current node. Another set of nodes is "start nodes." Start nodes are potential starting points when entering a new graph. The more starting points this set contains, the more choices a learner has when entering the unit. As a consequence, any strategy should implement at least two functions that can compute these sets and the ordering function that transforms those sets into ordered lists. The functions are described in further detail below using the following examples.

In the following examples, these definitions are used:

C is the set of all courses.

G is a set of graphs.

V is a set of vertices (e.g., knowledge items, references to learning units, references to sub courses, and test) Vertices are used when talking about graphs in a mathematical sense (whereas nodes may used to refer to the resulting course structure)

E is a set of edges (e.g., relations types as used in a mathematical sense).

TG={sc,lu} is the set of graph types such that:

sc=sub-course; and lu=learning unit.

TC={sc,lu,co,tst} is the set of content types such that:

sc=sub-course;

lu=learning unit;

co=content; and tst=test.

(With respect to assigning competences to a learner when passing a test, only pretests and posttests are defined as tests; self-tests and exercises are content rather than tests.)

TK={ . . . } is the set of all knowledge types (e.g., as described in the section E-learning content structure).

TR={ . . . } is the set of all relation types(e.g., as described in the section E-learning content structure).

BOOL={true, false} is the Boolean set with the values true and false.

MAC={ . . . } is the set of macro-strategies (e.g., as described in the section E-learning strategies).

MIC={ . . . }. is the set of micro-strategies (e.g., as described in the section E-learning strategies).

COMP={ . . .} is the set of all competences.

LCOMP⊆COMP is the set of a learner's competences.

TST={pre,post} is the set of test types, such that:

pre=pretest; and post=posttest.

A course $c=(G_c,g_s,mac,mic) \in C$ may be defined such that:

$G_c$ is the set of all sub-courses and learning units that are members of c;

$g_s$ is the start graph of course c, in particular $g_s \in G$;

mac∈MAC is the macro-strategy that has been chosen for navigating the course; and mic∈MIC is the micro-strategy that has been chosen for navigating the course.

Processing of the course begins with the start graph.

A graph $g=(V_g,E_g,t_g,comp_g) \in G$ may be defined such that:

$V_g$ is the set of all vertices in g;

$E_g \subseteq V_g \times V_g \times TR$ is the set of all edges in g;

$t_g \in TG$ is the graph type of g; and $comp_g \subseteq COMP$ Are the competencies of the graph.

In the following description the term content graph is used to identify the sub-graph to which a vertex refers, rather than a graph that includes the vertex. One can think of the vertex representing the "placeholder" of the sub-graph.

A vertex $v=(vs_v, tc_v, gc_c, tk_v, tt_v, mscore_v, ascore_v) \in V$ is defined such that:

- $vs_v \in BOOL$ is the visited status of v;
- $tc_v \in TC$ is the content type of v;
- $gc_v \in G$ is the content graph of v;
- $tk_v \in TK$ is the knowledge type of v;
- $tt_v \in TST$ is the test type of v;
- $mscore_v$ is the maximum possible test score of v; and
- $ascore_v$ is the test score actually attained for v.

An edge or relation type $e=(v_S, v_E, tr_e) \in E$ may be defined such that:

- $v_S \in V$ is the starting vertex of e;
- $v_E \in V$ is the end vertex of e; and
- $tr_e \in TR$ is the relation type of e.

A predicate is a mapping $p:V \to BOOL$ that assigns a value $b_p \in BOOL$ to each vertex $v \in V$. Therefore:

$$b_p = p(v).$$

An order is a mapping $ord: V \times V \to BOOL$ that assigns a value $b_{ord} \in BOOL$ to a pair of vertices $v_1, v_2 \in V$. Therefore:

$$b_{ord} = ord(v_1, v_2).$$

The mapping $sort: V^n, ord \to V^n$ is a sorting function from a set of vertices $V^n$ to a set of vertices $(v_1, \ldots, v_n) = \overline{V}^n$ with the order ord, provided that:

$$(v_1, \ldots, v_n) = sort(V^n, ord)$$

such that $$\forall_{i,j \in (1..n), i \neq j} v_i, v_j \in V^n : ord(v_i, v_j) = true$$

for $i \leq j$.

The following description explains the use of attributes. Attributes are used to define and implement the learning strategies.

Let $g=(V_g, E_g, t_g, comp_g) \in G$ be a graph with the following attributes:

- $g.nodes = V_g$ Are the vertices of g;
- $g.type = t_g$ is the type of g; and
- $g.comp = comp_g$ is the graph's competencies.

Let $v=(vs_v, tc_v, gc_c, tk_v, tt_v, mscore_v, ascore_v) \in V$ be a vertex with the following attributes:

- $v.visited = vs_v$ is the visited status of vertex v (initially this value is false);
- $v.graph = \{g=(V_g, E_g, t_g) \in G | v \in V_g\}$ is the graph that contains v;
- $v.contentType = tc_v$ is the content type of v;

$$v \cdot contentGraph = \begin{cases} g' \in G : tc_v = sc \vee tc_v = lu \\ undef : \text{otherwise} \end{cases}$$

is the content graph of v;

$v.knowType = tk_v$ is the knowledge type of v;

$$v \cdot testType = \begin{cases} tt_v \in TST : tc_v = tst \\ undef : \text{otherwise} \end{cases}$$

is the test type of v;

- $v.mscore = mscore_v$ is the maximum possible test score of v (initially this value is 0);
- $v.ascore = ascore_v$ is the actual test score attained for v (initially this value is −1)

Let $e=(v_S, v_E, tr_e) \in E$ be an edge with the following attributes:

- $e.start = v_S$ is the starting vertex of e;
- $e.end = v_E$ is the end point of e;
- $e.type = tr_e$ is the relation type of e;

An edge's logical direction does not necessarily have to agree with the direction indicated by the course player, because the course player displays an edge in the "read direction." This applies to the following edge, for example, $e=(v_S, v_E, \text{"is a subset of"})$. The following explanation refers to the logical direction, in other words, the direction of the edge in the above-described cases is considered to be "rotated." In the following, undirected edges are treated as two edges in opposite directions.

Predicates are "dynamic attributes" of vertices. The strategy computes the dynamic attributes for an individual vertex when necessary.

The following are examples of predicates:

Visited(v): the vertex v has already been visited;
Suggested(v): the vertex v is suggested;
CanNavigate(v): the vertex v can be navigated; and
Done(v): the vertex v is done.

If a vertex is within a learning unit (i.e., v.graph.type=lu), then the micro-strategy is used to compute the predicates. The macro-strategy that is chosen is responsible for determining all other vertices.

Functions are used to compute the navigation sets (vertices that are displayed). A function should return a set of vertices. The strategies implement the functions.

For example, the following functions are:

$\overline{V} = StartNodes(g) = \{\overline{v} | v \text{ is a starting vertex of } g\}$ is the set of all starting vertices of graph g. Starting vertices are the vertices of a graph from which navigation within the graph may be initiated in accordance with a chosen strategy.

$\overline{V} = NextNodes(v) = \{\overline{v} | v \text{ is a successor of } v\}$ is the set of all successor vertices of vertex v.

For micro-strategies, the chosen macro-strategy calls the functions as needed. When entering a learning unit the macro-strategy selects the appropriate (selected) micro-strategy.

Operations provide information to the chosen strategy about particular events that occur during navigation of a course. The strategy may use them to change the attributes. The operations are:

navigate(v); The runtime environment calls this operation as soon as the vertex v is navigated during the navigation of the course.

testDone(v,MaxScore,ActScore); The runtime environment calls this operation if the vertex v is a test (v.contentType=tst) that has been done. MaxScore contains the maximum possible score, ActScore the score actually attained.

If a vertex is in a learning unit, which means that v.graph.type=lu, then the micro-strategy computes these operations. The macro-strategy is responsible for all other vertices.

The runtime environment uses the sorting function to order the navigation sets that have been computed. The order determines the sequence in which the vertices are to be drawn. The "most important" vertex (e.g., from the strategy's point of view) is placed at the start of the list (as the next vertex suggested). The strategies implement these sorting functions and the runtime environment provides them. The following examples of sorting functions may be defined:

sortNav(V) is used to sort the set of navigation vertices.

The sorting functions are called automatically as soon as the functions have returned sets of vertices to the strategy in question. It is consequently necessary that each macro and micro-strategy have a sorting function at its disposal.

The following description explains the predicates, operations, functions, and sorting functions associated with macro-strategies.

The following is an example of how a top-down (deductive) learning strategy may be realized.

The predicates for the top-down strategy may be defined as follows:

Visited (v): v.visited

The vertex's "visited" attribute is set.

Suggested(v): $\forall (\bar{v},v,tr) \in E$ such that tr=prerequisite we have:

Done($\bar{v}$)=true

All of the vertex's prerequisites are satisfied.

CanNavigate(v): Suggested(v)

Is used in this example like Suggested.

Done(v):

(v.contentType $\in \{sc,lu\} \wedge$ v.contentGraph.comp$\neq \emptyset$ $\subseteq$ LCOMP)$\vee$ (v.contentType$\neq$tst$\wedge$v.visited=true$\wedge$($\forall$ $\bar{v}\in$StartNodes(v.contentGraph): Done($\bar{v}$)=true))$\vee$ (c.contentType=tst$\wedge$(v.ascore*2)$\geq$v.mscore)

The vertex v is considered done if at least one of the following conditions holds:

It includes a learning unit or sub-course that has at its disposal a nonempty set of competences that the learner already possesses;

It does not contain a test, is visited, and all of the content graph's starting vertices have been done; and/or It deals with a test and at least half of the maximum score has been attained.

The functions for the top-down strategy may be defined as follows:

$$StartNodes(g) = \begin{cases} g = undef : \emptyset \\ g \cdot type = lu : c \cdot mic \cdot StartNodes(g) \\ g \cdot type = sc : \{v \in V_g | \forall (v^*, v, tr) \in E : tr \neq hierarchical\} \end{cases}$$

If g is undefined, which means that vertex does not have any content graphs, then the set is empty.

If g is a learning unit, the StartNodes( ) function of the chosen micro-strategy will be used.

If g is a sub-course, all vertices that do not have any hierarchical relations referring to them will be returned.

NextNodes(v)=$\{\bar{v}\in V_{v\ graph}|\exists(v,\bar{v},tr)\}\cup$StartNodes (v.contentGraph)

All vertices connected to v by an externally directed relation, plus all vertices that are starting vertices of the content graph of v.

The operations for top-down may be defined as follows:

navigate(v): v.visited=true

The vertex's "visited" attribute is set to true. testDone(v, MaxScore, ActScore): v.mscore=MaxScore, v.ascore=ActScore if $$\begin{cases} Done(v) = true : LCOMP = LCOMP \cup v \cdot graph \cdot comp, \forall\ \bar{v} \in v \cdot graph : \bar{v} \cdot visited = true \\ Done(v) = false : \forall\ \bar{v} \in v \cdot graph : \bar{v} \cdot visited = false \end{cases}$$

The maximum test score and the test score actually attained for the vertex are both set.

If the test is passed, the learner competences will be enlarged to include the competences of the graph, and all of the graph's vertices will be set to "visited."

If the test is not passed, all of the graph's vertices are reset to "not visited."

The sorting functionsortNav(V) may be defined upon an order relation $<:V_1\times V_2\to$bool on a set of vertices. This requires that the following auxiliary functions be defined:

1. An order relation for vertices with respect to the vertex ID $<_{id}:V\times V\to$bool $v_1<_{id}v_2:\Leftrightarrow v_1.id<v_2.id$ 2. A comparison relation for vertices with respect to the vertex ID $=:V\times V\to$bool, $v_1=v_2:\Leftrightarrow v_1.id=v_2.id$ 3. An order relation on the test types and unit types $<_{test}:(TC\times TST)\times(TC\times TST)\to$bool (tst,pre)<(co,undef)<(lu,undef)<(tst,post)

4. An order relation based on 3. for vertices with respect to the test types and unit types.

$<_{test}:V\times V\to$bool $v_1<_{test} v_2:\Leftrightarrow(v_1.contentType, v_1.testType)<_{test}$
 $(v_2.contentType, v_2.testType)$ 5. A comparison relation for vertices with respect to the test types and unit types $=_{test}:V\times V\to$bool $v_1=_{test} v_2:\Leftrightarrow(v_1.contentType,v_1.testType)=$
 $(v_2.contentType,v_2.testType)$ 6. An order relation on the knowledge types based on one of the micro-strategies (see micro-strategies)

$<_{micro}:TK\times TK\to$bool

7. An order relation based on 6. on the vertices with respect to the micro-strategies.

$$<_{micro}: V \times V \to bool$$

$$v_1 <_{micro} v_2 \Leftrightarrow v_1.knowType <_{micro} v_2.knowType$$

8. A comparison relation to the vertices in regard to the knowledge types $$=_{micro}: V \times V \to bool$$

$$v_1 =_{micro} v_2 \Leftrightarrow v_1.knowType = v_2.knowType$$

Using these definitions the function $<: V_1 \times V_2 \to bool$ may be defined as follows:

$$v_1 < v_2 : \Leftrightarrow \begin{cases} \begin{array}{l} v_1 \cdot contentType \neq tst \wedge \\ \exists v \in V_1 : [(v_1 \cdot v, prereq) \in E_1 \wedge v \cdot contentType \neq tst \wedge v_1 < v \wedge v \leq v_2] \\ \vee v_1 <_{test} v_2 \\ \vee v_1 =_{test} v_2 \wedge v_1 <_{id} v_2 \end{array} & \text{if} \quad g_1 = g_2, t_1 \neq lu \\ \begin{array}{l} v_1 \cdot contentType \neq tst \wedge \\ \exists v \in V_1 : [(v_1, v, prereq) \in E_1 \wedge v \cdot contentType \neq tst \wedge v_1 < v \wedge v \leq v_2] \\ \vee v_1 <_{test} v_2 \\ \vee v_1 =_{test} v_2 \wedge v_1 <_{micro} v_2 \\ \vee v_1 =_{test} v_2 \wedge v_1 =_{micro} v_2 \wedge v_1 <_{id} v_2 \end{array} & \text{if} \quad g_1 = g_2, t_1 = lu \\ \exists v = (vs, t_1, g_1, tk, tt, ms, as) \in V_2 : (v, v_2, tr) \in E_2 \wedge tr \in \{prereq, hierarchical\} & \text{if} \quad g_1 \neq g_2, t_1 = lu, t_2 \neq lu \\ false & \text{otherwise} \end{cases}$$

Figure 37:
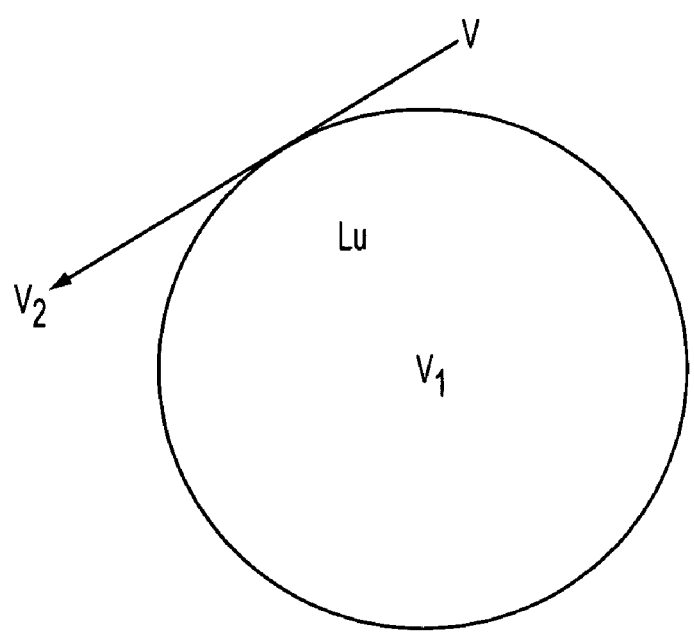
FIG. 37 is an example showing v as the vertex that represents the learning unit LU where $v_1, v_2$ are the vertices.

Note, if $g_1 = g_2$, then it is obvious that $V_1 = V_2, E_1 = E_2, t_1 = t_2$ and $comp_1 = comp_2$. In addition, in case 3, a situation is maintained in which no direct relation between the vertices exists, but there does exist a relation to the higher-order vertex. The order relation will then also apply to all of the vertices in this vertex's content graph. This situation is depicted in FIG. 37, where v is the vertex that represents the learning unit and $v_1, v_2$ are the vertices under consideration.

The function sortNav(V) is the sort of the set V in accordance with the order relation <.

The following process is one method of implementing the function sortNav(V):

1. $V_{preTest} = \{v \in V | v.contentType = tst \wedge v.testType = pre\}$: the set of all pretests.
2. $V = V - V_{preTest}$: remove all pretests from V.
3. $V_{postTest} = \{v \in V | v.contentType = tst \wedge v.testType = post\}$: the set of all posttests.
4. $V = V - V_{postTest}$: remove all posttests from V.
5. $V_{preReq} = \{v \in V | \exists (\overline{v}, v, tr) \in (E: tr = prerequisite\}$: the set of all vertices that have a prerequisite relation directed toward them.
6. $V = V - V_{preReq}$: remove all vertices in $V_{preReq}$ from V.
7. $L = V_{preTest}$: add all pretests into the sorted list.
8. $L = L \cup \{v \in V | v.contentType = co\}, V = V - L$: enlarge the sorted list to include all vertices that have a learning unit and then remove these vertices from V.
9. $L = L \cup \{v \in V | v.contentType = lu\}, V = V - L$: enlarge the sorted list to include all vertices that contain a learning unit and then remove these vertices from V.
10. $L = L \cup V$: enlarge the sorted list to include the remaining vertices from V.
11. Search for all vertices in $v \in V_{preReq}$:
    the vertex $v^* \in L$ such that
    $(v^*, v, prerequisite) \in E \wedge dist(v^*) = MAX$ (the vertex that is located farthest back in L and that possesses a prerequisite relation to v).
    Add v into L behind $v^*$.
12. $L = L \cup V_{postTest}$: enlarge the sorted list to include all posttests.
13. Return the sorted list L as the result.

The subsets determined in steps 7–12 are themselves sorted by the order relation $<_{id}$.

The following is an example of how a bottom-up (Inductive) learning strategy may be implemented.

The predicates for this strategy may be the same as those used for the macro-strategy, top-down. The functions for bottom-up may be defined as follows:

$$StartNodes(g) = \begin{cases} g = undef : \emptyset \\ g \cdot type = lu : c \cdot mic \cdot StartNodes(g) \\ g \cdot type = sc : \{v \in V_g | \forall (v^*, v, tr) \in E : tr \neq hierarchical\} \end{cases}$$

If g is undefined, the vertex doesn't have a content graph and the set is empty.

If g is a learning unit, then the StartNodes( ) function of the chosen micro-strategy will be used.

If g is a sub-course, then all vertices that do not have any hierarchical relations referring to them will be returned.

$$NextNodes(v) = \{\overline{v} \in V_{v.graph} \exists (\overline{v}, v, tr)\} \cup$$

$$\begin{cases} v \cdot contentType = le \wedge \exists\, (v, v^*, tr) \in E : tr = hierarchic \wedge Done\,(v^*) = false : \\ OrientationOnly \cdot StartNodes\,(v \cdot contentGraph) \\ else: \\ StartNodes\,(v \cdot contentGraph) \end{cases}$$

All vertices that are connected to v by an externally directed relation.

If the vertex contains a learning unit and one of the hierarchically subordinate vertices has not yet been visited, enlarge the set to include the learning unit's starting vertex using the micro-strategy "orientation only." Otherwise, enlarge the set to include all vertices that are starting vertices of the content graph of v.

The operations and sorting function for the bottom-up strategy are the similar to the macro-strategy top-down and therefore are not repeated.

Linear macro-strategies represent a special case of the macro-strategies that have already been described. In linear macro-strategies, the elements of the sorted sets of vertices are offered for navigation sequentially, rather than simultaneously. This linearization may be applied to any combination of macro and micro-strategies.

The following description includes examples of how a micro-strategy may be realized. In this example, an orientation only micro-strategy is described.

The predicates for the micro-strategies may be defined as follows:

Visited(v): v.visited

The vertex's "visited" attribute is set.

Suggested(v): $\forall (\bar{v},v,tr) \in E$ such that tr=prerequisite we have:

Done(v)=true

All of the vertex's prerequisites are already satisfied.

CanNavigate(v): Suggested(v)

This may be used like Suggested.

Done(v):

(v.contentType≠tst∧v.visited=true)∨
(c.contentType=tst∧(v.ascore*2)≧v.mscore)

The vertex v is considered done if:

It does not contain a test and has already been visited.

It deals with a test and at least half of the maximum score has been attained.

The functions may be defined as follows:

StartNodes(g)={v∈V$_g$|v.knowType=Orientation}∪
{v∈V$_g$|∃(v,$\bar{v}$,tr)∈E:tr=prereq∧$\bar{v}$.knowType=Orientation}

The set of all vertices with knowledge type orientation, plus all vertices that have a prerequisite relation to a vertex with knowledge type orientation.

NextNodes(v)=∅

For this micro-strategy, this is always the empty set. In other words, no successor vertices exist because all relevant vertices are contained in the set of starting vertices.

The operations may be defined as follows:

navigate(v): v.visited=true

The vertex's "visited" attribute is set to true.

testDone(v, MaxScore, ActScore): v.mscore=MaxScore, v.ascore=ActScore if $$\begin{cases} Done\,(v) = true : LCOMP = LCOMP \cup v \cdot graph \cdot comp,\, \forall\, \bar{v} \in v \cdot graph : \bar{v} \cdot visited = true \\ Done\,(v) = false : \forall\, \bar{v} \in v \cdot graph : \bar{v} \cdot visited = false \end{cases}$$

The maximum test score and the test score actually attained for the vertex are both set.

If the test is passed, the learner competences will be enlarged to include the competences of the graph, and all of the graph's vertices will be set to "visited."

If the test is not passed, all of the graph's vertices are reset to "not visited."

The micro-strategy orientation only may use a sorting function that is similar to sorting function for the macro-strategy top-down and, therefore is not repeated.

The following is an example of the implementation of an example oriented micro-strategy. The predicates for this strategy are identical to those for the micro-strategy orientation only and are not repeated.

The functions may be defined as follows:

StartNodes(g)=V$_g$

All vertices that are contained in the learning unit.

NextNodes(v)=∅

For this micro-strategy, this is always the empty set. In other words, no successor vertices exist because all relevant vertices are contained in the set of starting vertices.

The operations for the example-oriented micro-strategy are identical to those for the micro-strategy "orientation only," and, therefore, are not repeated.

The sorting function for example-oriented is defined as follows:

$$v_1 < v_2 : \Leftrightarrow \begin{cases} v_1 <_{test} v_2 \vee & \\ v_1 =_{test} v_2 \wedge v_1 <_{id} v_2 & \text{if} \quad v_2 \cdot contentType = tst \\ \exists (v_1, v_2, tr) \in E : tr = prereq \vee & \\ (v_1 \cdot knowType = Example \wedge v_1 <_{id} v_2) & \text{if} \quad v_2 \cdot knowType = Example \\ v_1 \cdot knowType = Example \vee & \\ v_1 <_{id} v_2 & \text{otherwise} \end{cases}$$

Steps for executing sortNav(V):
1. $V_{examp} = \{v \in V | v.knowType = Example\} \cup \{v \in V | \exists(v, \bar{v}, tr) \in E : tr = prereq \wedge \bar{v}.knowType = Example\}$: the set of all vertices that contain examples, plus the prerequisites of these vertices.
2. $V_{remain} = V - V_{examp}$: the remaining vertices from V.
3. $L_{examp} = TopDown.sortNav(V_{examp})$: sort the set of examples using the sorting algorithm from the top-down strategy.
4. $L_{remain} = TopDown.sortNav(V_{remain})$: sort the set of remaining vertices using the sorting algorithm from the top-down strategy.
5. $L = L_{examp} \cup L_{remain}$: form the union of the two sorted lists.
6. Return the sorted list L as the result.

The predicates, functions, and operations for the micro-strategy explanation-oriented are identical to those for the micro-strategy example-oriented, and, therefore are not repeated. The sorting function for the explanation-oriented micro-strategy is similar to the sorting function of the micro-strategy example-oriented (the only difference being that explanations, rather than examples, are used to form the two sets).

The predicates, functions, and operations for the micro-strategy action-oriented are identical to those for the micro-strategy example-oriented, and, therefore are not repeated. The sorting function for the action-oriented micro-strategy is similar to the sorting function of the micro-strategy example-oriented (the only difference being that actions, rather than examples, are used to form the two sets).

A number of implementations have been described. Nevertheless, it will be understood that various modifications may be made. For example, advantageous results may be achieved if the steps of the disclosed techniques are performed in a different order and/or if components in a disclosed system, architecture, device, or circuit are combined in a different manner and/or replaced or supplemented by other components. Accordingly, other implementations are within the scope of the following claims.

What is claimed is:

1. A method, performed by one or more processing devices, for making an electronic course available offline, the method comprising:
   generating, via a processing device, a generic packaging list for the electronic course, the generic packaging list comprising learner-independent metadata, the learner-independent metadata corresponding to content associated with the electronic course that is not specific to a learner, the content comprising structural elements that make up the electronic course;
   generating, via a processing device, learner-specific metadata, the learner-specific metadata comprising data associated with the electronic course that is specific to the learner, the data corresponding to a learning strategy for selecting structural elements to define a path through the electronic course,
   the learning strategy comprising a macrostrategy and a microstrategy, the macrostrategy defining an order in which to present a first set of the structural elements, the microstrategy defining an order in which to present a second set of the structural elements, the second set of structural elements comprising constituents of structural elements in the first set of structural elements, the macrostrategy and the microstrategy being independent of one another allowing customizing of both the macrostrategy and the microstrategy during the electronic course, and
   the learning strategy being applicable to the structural elements to define the path through the electronic course, the structural elements storing attributes relating to the learning strategy, and the learning strategy altering at least one of the attributes when the learning strategy is applied to the structural elements;
   merging, via a processing device, the generic packaging list and the learner-specific metadata to form a learner-specific packaging list;
   downloading the learner-specific packaging list to a target processing device; and
   downloading, for presentation offline, at least part of the electronic course to the target processing device, the at least part of the electronic course being downloaded based on the learner-specific packaging list.

2. The method of claim 1, wherein generating the generic packaging list comprises obtaining, for the electronic course, one or more of a title, a global unique identifier (GUID), a content management system path, and resources.

3. The method of claim 1, further comprising storing the generic packaging list in a content repository.

4. The method of claim 1, further comprising testing the content to determine whether structural elements of the course are accessible to the target processing device.

5. The method of claim 4, further comprising storing the generic packaging list in a content repository if it is determined that all structural elements are accessible.

6. The method of claim 1, further comprising publishing an indication that the electronic course is offered offline.

7. The method of claim 6, wherein the indication is published in a course catalog for the electronic course, the course catalog being accessible online.

8. The method of claim 6, wherein the indication comprises an access path for the generic packaging list.

9. The method of claim 1, wherein the learner-specific packaging list further comprises one or both of a training participation document and a resource reference.

10. The method of claim 1, wherein the learner-specific metadata further comprises a reference to training specific metadata.

11. A learning system for making an electronic course available offline on a target processing device, comprising:
   memory that stores executable instructions; and
   one or more processing devices that execute the instructions to:
      generate a generic packaging list for the electronic course, the generic packaging list comprising learner-independent metadata, the learner-independent metadata corresponding to content associated with the electronic course that is not specific to a learner, the content comprising structural elements that make up the electronic course;
      generate learner-specific metadata, the learner-specific metadata comprising data associated with the electronic course that is specific to the learner, the data corresponding to a learning strategy for selecting structural elements to define a path through the electronic course,
         the learning strategy comprising a macrostrategy and a microstrategy, the macrostrategy defining an order in which to present a first set of the structural elements, the microstrategy defining an order in which to present a second set of the structural elements, the second set of structural elements comprising constituents of structural elements in the first set of structural elements, the macrostrategy and the microstrategy being independent of one another allowing customizing of both the macrostrategy and the microstrategy during the electronic course, and
         the learning strategy being applicable to the structural elements to define the path through the electronic course, the structural elements storing attributes relating to the learning strategy, and the learning strategy altering at least one of the attributes when the learning strategy is applied to the structural elements;
      merge the generic packaging list and the learner-specific metadata to form a learner-specific packaging list;
      download the learner-specific packaging list to the target processing device; and
      download, for presentation offline, at least part of the electronic course to the target processing device, the at least part of the electronic course being downloaded based on the learner-specific packaging list.

12. The system of claim 11, wherein the generic packaging list comprises, for the electronic course, one or more of a title, a global unique identifier (GUID), a content management system path, and resources.

13. The system of claim 11, further comprising a content repository to store the structural elements;
   wherein the one or more processing devices execute instructions to store the generic packaging list in the content repository.

14. The system of claim 11, wherein the one or more processing devices execute instructions to test the content to determine whether structural elements of the electronic course are accessible to the target processing device.

15. The system of claim 14, wherein the one or more processing devices execute instructions to store the generic packaging list in a content repository if it is determined that the structural elements of the electronic course are accessible.

16. The system of claim 11, wherein the one or more processing devices execute instructions to publish an indication that the electronic course is offered offline.

17. The system of claim 16, wherein the indication is published in a course catalog for the electronic course, the course catalog being accessible online.

18. The system of claim 16, wherein the indication comprises an access path for the generic packaging list.

19. The system of claim 11, wherein the learner-specific packaging list further comprises one or both of a training participation document and a resource reference.

20. The system of claim 11, wherein the learner-specific metadata comprises a reference to training-specific metadata.

21. A method performed by one or more processing devices for making an electronic course available offline to a target processing device, the method comprising:
   generating, via a processing device, a generic packaging list for the electronic course, the generic packaging list comprising learner-independent metadata, the learner-independent metadata corresponding to content associated with the electronic course that is not specific to a learner, the content comprising structural elements that make up the electronic course;
   generating, via a processing device, learner-specific metadata, the learner-specific metadata comprising data associated with the electronic course that is specific to the learner, the data corresponding to a learning strategy for selecting structural elements to define a path through the electronic course,
      the learning strategy comprising a macrostrategy and a microstrategy, the macrostrategy defining an order in which to present a first set of the structural elements, the microstrategy defining an order in which to present a second set of the structural elements, the second set of structural elements comprising constituents of structural elements in the first set of structural elements, the macrostrategy and the microstrategy being independent of one another allowing customizing of both the macrostrategy and the microstrategy during the electronic course, and
      the learning strategy being applicable to the structural elements to define the path through the electronic course, the structural elements storing attributes relating to the learning strategy, and the learning strategy altering at least one of the attributes when the learning strategy is applied to the structural elements; and
   merging the generic packaging list and the learner-specific metadata to form a learner-specific packaging list for use by the target processing device in presenting the electronic course offline.

22. The method of claim 21, wherein the generic packaging list comprises, for the electronic course, one or more of a title, a global unique identifier (GUID), a content management system path, and resources.

23. The method of claim 21, wherein the learner-specific packaging list comprises one or both of a training participation document and a resource reference.

24. A computer program product for making an electronic course available offline to a target processing device, the computer program product being tangibly embodied on one or more machine-readable media, the computer program product being operable to cause a machine to:
   generate a generic packaging list for the electronic course, the generic packaging list comprising learner-independent metadata, the learner-independent metadata corresponding to content associated with the electronic course that is not specific to a learner, the content comprising structural elements that make up the electronic course;

generate learner-specific metadata, the learner-specific metadata comprising data associated with the electronic course that is specific to the learner, the data corresponding to a learning strategy for selecting structural elements to define a path through the electronic course, the learning strategy comprising a macrostrategy and a microstrategy, the macrostrategy defining an order in which to present a first set of the structural elements, the microstrategy defining an order in which to present a second set of the structural elements, the second set of structural elements comprising constituents of structural elements in the first set of structural elements, the macrostrategy and the microstrategy being independent of one another allowing customizing of both the macrostrategy and the microstrategy during the electronic course, and the learning strategy being applicable to the structural elements to define the path through the electronic course, the structural elements storing attributes relating to the learning strategy, and the learning strategy altering at least one of the attributes when the learning strategy is applied to the structural elements; and merge the generic packaging list and the learner-specific metadata to form a learner-specific packaging list for use by the target processing device in presenting the electronic course offline.

25. The computer program product of claim 24, wherein the computer program product is operable to cause the machine to:

download the learner-specific packaging list to the target processing device; and download, for presentation offline, at least part of the electronic course to the target processing device, the at least part of the electronic course being downloaded based on the learner-specific packaging list.

26. The computer program product of claim 24, wherein generating the generic packaging list comprises obtaining, for the electronic course, one or more of a title, a global unique identifier (GUID), a content management system path, and resources.

27. The computer program product of claim 24, wherein the computer program product is operable to cause the machine to store the generic packaging list in a content repository.

28. The computer program product of claim 24, wherein the computer program product is operable to cause the machine to test the content to determine whether structural elements of the course are accessible to the target processing device.

29. The computer program product of claim 28, wherein the computer program product is operable to cause the machine to store the generic packaging in a content repository list if it is determined that all structural elements are accessible.

30. The computer program product of claim 24, the computer program product is operable to cause the machine to publish an indication that the electronic course is offered offline.

31. The computer program product of claim 30, wherein the indication is published in a course catalog for the electronic course, the course catalog being accessible online.

32. The computer program product of claim 31, wherein the indication comprises an access path for the generic packaging list.

33. The computer program product of claim 24, wherein the learner-specific packaging list further comprises one or both of a training participation document and a resource reference.

34. The computer program product of claim 24, wherein the learner-specific metadata further comprises a reference to training specific metadata.

* * * * *